(12) United States Patent
Okamori

(10) Patent No.: US 8,775,497 B2
(45) Date of Patent: Jul. 8, 2014

(54) TERMINAL DEVICE, INFORMATION PROCESSING SYSTEM, REQUEST TARGET SELECTION METHOD AND PROGRAM

(75) Inventor: Atsushi Okamori, Tokyo (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 13/221,243

(22) Filed: Aug. 30, 2011

(65) Prior Publication Data

US 2012/0059867 A1  Mar. 8, 2012

(30) Foreign Application Priority Data

Sep. 6, 2010  (JP) ................. 2010-198982

(51) Int. Cl.
*G06F 15/177* (2006.01)
*G06F 9/50* (2006.01)

(52) U.S. Cl.
CPC ............ *G06F 9/5044* (2013.01); *G06F 9/5094* (2013.01); *G06F 9/5055* (2013.01)
USPC ............................ 709/201; 709/224; 709/220

(58) Field of Classification Search
USPC ......... 709/201, 224–226, 227–229, 220–222; 718/105, 104, 102, 100
See application file for complete search history.

(56) References Cited

U.S. PATENT DOCUMENTS

| | | | |
|---|---|---|---|
| 6,463,457 B1 * | 10/2002 | Armentrout et al. | 709/201 |
| 8,131,302 B2 * | 3/2012 | Quigley et al. | 455/450 |
| 8,355,709 B2 * | 1/2013 | Nagaraj | 455/419 |
| 2008/0268828 A1 | 10/2008 | Nagaraja | |
| 2009/0023452 A1 | 1/2009 | Quigley et al. | |
| 2009/0132642 A1 | 5/2009 | Ortal et al. | |

FOREIGN PATENT DOCUMENTS

| | | |
|---|---|---|
| JP | 2005-011346 A | 1/2005 |
| JP | 2010-527057 A | 8/2010 |

OTHER PUBLICATIONS

Yang et al., On effective offloading services for resource-constrained mobile devices running heavier mobile Internet applications. IEEE Commun. Mag., 2008; 46(1):56-63.

Messer et al., Towards a distributed platform for resource-constrained devices. Proceed. of 22nd Intl. Conf. on Distr. Comp. Systems, 2002; Conf. 22: 37-45.

* cited by examiner

*Primary Examiner* — Kenneth R Coulter

(74) *Attorney, Agent, or Firm* — Wolf, Greenfield & Sacks, P.C.

(57) ABSTRACT

The terminal device includes a processing section which performs a predetermined process; a connecting section which is configured for connection with an external apparatus capable of performing the predetermined process through a communication network; and a selecting section which selects the processing section or the external apparatus connected through the connecting section as a request target which is requested to perform the predetermined process, on the basis of a predetermined condition.

28 Claims, 21 Drawing Sheets

FIG. 6

| COMMUNICATION ENVIRONMENT | ELECTRIC STORAGE AMOUNT | DETERMINATION RESULT |
|---|---|---|
| HIGH SPEED | LARGE | SERVER APPARATUS |
| LOW SPEED | LARGE | TERMINAL DEVICE |
| COMMUNICATION IS IMPOSSIBLE | LARGE | TERMINAL DEVICE |
| HIGH SPEED | SMALL | SERVER APPARATUS |
| LOW SPEED | SMALL | SERVER APPARATUS |
| COMMUNICATION IS IMPOSSIBLE | SMALL | TERMINAL DEVICE |

FIG. 7

| COMMUNICATION ENVIRONMENT | PROCESSING LOAD | DETERMINATION RESULT |
|---|---|---|
| HIGH SPEED | HIGH | SERVER APPARATUS |
| LOW SPEED | HIGH | SERVER APPARATUS |
| COMMUNICATION IS IMPOSSIBLE | HIGH | TERMINAL DEVICE |
| HIGH SPEED | LOW | SERVER APPARATUS |
| LOW SPEED | LOW | TERMINAL DEVICE |
| COMMUNICATION IS IMPOSSIBLE | LOW | TERMINAL DEVICE |

FIG. 8

| COMMUNICATION ENVIRONMENT | VERSION | DETERMINATION RESULT |
|---|---|---|
| HIGH SPEED | SAME | SERVER APPARATUS |
| LOW SPEED | SAME | TERMINAL DEVICE |
| COMMUNICATION IS IMPOSSIBLE | SAME | TERMINAL DEVICE |
| HIGH SPEED | SERVER > TERMINAL | SERVER APPARATUS |
| LOW SPEED | SERVER > TERMINAL | SERVER APPARATUS |
| COMMUNICATION IS IMPOSSIBLE | SERVER > TERMINAL | TERMINAL DEVICE |

TERMINAL DEVICE, INFORMATION PROCESSING SYSTEM, REQUEST TARGET SELECTION METHOD AND PROGRAM

BACKGROUND

The present disclosure relates to a terminal device, an information processing system, a request target selection method and a program.

In recent years, there has been proposed a cloud computing technique in the related art. According to the cloud computing technique, a user can realize a desired process using services (hereinafter, referred to as cloud services) provided by a server apparatus or a server apparatus group connected through a network. Recently, it has become possible to utilize a variety of applications, such as electronic mail, a text editing application, a spreadsheet application, an image management application, an image editing application and a translation application, as cloud services.

With the use of cloud services, a user does not have to install an application to his or her terminal device. In a case where the application is executed using cloud services, a process relating to execution of the application is mainly performed by a server apparatus which provides cloud services. Thus, with the use of cloud services, the user can utilize a desired application even when the processing capability of the terminal device is small or it is difficult to install the application due to insufficient memory space.

A client-server system such as a cloud computing system is widely used in a variety of fields. In such a system, there is provided communication intermediating means which undertakes address settlement on a network, connection setting, data transmission and reception, and the like. For example, Japanese Unexamined Patent Application Publication No. 2003-76563 discloses a configuration of communication intermediating means which is called an ORB (Object Request Broker). The ORB is mainly used in a distributed computing field, which is middleware for realizing a program call between computers through a network. RMI (Remote Method Invocation) included in JAVA (registered trademark) is an example of an ORB.

Further, in a client-server system in which a plurality of server apparatuses is present, it is also important to appropriately select a server apparatus to be used. Japanese Unexamined Patent Application Publication No. 2000-47890 discloses a technique in which a server apparatus to perform a process is appropriately switched according to the processing capability of each server apparatus, a processing load, a network traffic situation and the like. Further, with regard to the client-server system, Japanese Patent No. 4042527 discloses a technique in which an interface of a call source can be used without replacement even when component call interfaces of a client and a server are different from each other.

SUMMARY

The demand for the client-server system such as a cloud computing system or a distributed computing system has been increasing. Further, as described above, a variety of research and development has been carried out in order to enhance convenience and efficiency of the client-server system. However, as for a system configuration which utilizes processing capability of a terminal device on a client side or a system configuration which dynamically disperses a process depending on the circumstances of the client terminal device, sufficient research and development has not yet been carried out. For example, there is not known a technique which appropriately selects a terminal device or a server apparatus which performs a process at a specific time point depending on the circumstances of the terminal device.

Accordingly, it is desirable to provide a terminal device, an information processing system, a request target selection method and a program which are capable of appropriately selecting a processing subject depending on the circumstances of the terminal device.

According to an embodiment of the present disclosure, there is provided a terminal device including a processing section which performs a predetermined process; a connecting section which is configured for connection with an external apparatus capable of performing the predetermined process through a communication network; and a selecting section which selects the processing section or the external apparatus connected through the connecting section as a request target which is requested to perform the predetermined process, on the basis of a predetermined condition.

Further, the terminal device may further include a data output section which outputs data for which the predetermined process is to be performed. In this case, when the request target is changed into the processing section from the external apparatus by the selecting section, the connecting section stops the data output of the data output section and obtains data necessary for the processing section to continuously perform the predetermined process from the external apparatus.

Further, the terminal device may further include a load state detecting section which detects a load state of the processing section. In this case, the selecting section selects the external apparatus connected through the connecting section in a case where the load state of the processing section detected by the load state detecting section is high, and selects the processing section in a case where the load state of the processing section detected by the load state detecting section is low.

Further, the terminal device may further include a connection state detecting section which detects a connection state through the connecting section. In this case, the selecting section selects the processing section or the external apparatus connected through the connecting section, according to the connection state detected by the connection state detecting section.

Further, the connection state detecting section may detect whether high speed communication is available with respect to the external apparatus, and the selecting section may select the external apparatus connected through the connecting section in a case where it is detected by the connection state detecting section that high speed communication is available with respect to the external apparatus.

Further, the connection state detecting section may detect a bandwidth which is available for communication with the external apparatus, and the selecting section may select the external apparatus connected through the connecting section in a case where the bandwidth detected by the connection state detecting section is larger than a predetermined threshold.

Further, the terminal device may further include an electric storage section which stores electric power used for at least an operation of the processing section; and a residual amount detecting section which detects the amount of the electric power stored in the electric storage section. In this case, the selecting section selects the external apparatus connected through the connecting section in a case where the amount of electric power detected by the residual amount detecting section is smaller than a predetermined value.

Further, the terminal device may further include a timing obtaining section which inquires of the external apparatus a timing when a processing subject is able to be changed from the external apparatus to the processing section and obtains information indicating the timing from the external apparatus, when the request target is changed into the processing section from the external apparatus by the selecting section. In this case, the connecting section allows the data output section to restart the data output at the timing indicated by the information obtained by the timing obtaining section and allows the processing section to perform the predetermined process.

Further, the terminal device may further include: a version information obtaining section which obtains information on a version of an algorithm used when the external apparatus performs the predetermined process; and a version comparing section which compares the version indicated by the version information obtained by the version information obtaining section with a version of an algorithm used when the processing section performs the predetermined process. In this case, the selecting section selects the external apparatus, in a case where it is determined on the basis of a comparison result of the version comparing section that the version indicated by the version information obtained by the version information obtaining section is new.

According to another embodiment, there is provided an information processing system including an external apparatus including a first processing section which performs a predetermined process; and a terminal device including a second processing section which performs the predetermined process, a connecting section which is configured for connection with the external apparatus through a communication network, and a selecting section which selects the second processing section or the external apparatus connected through the connecting section as a request target which is requested to perform the predetermined process, on the basis of a predetermined condition.

According to still another embodiment, there is provided a request target selection method including: by a terminal device including a processing section which performs a predetermined process, and a connecting section which is configured for connection with an external apparatus capable of performing the predetermined process through a communication network, selecting the processing section or the external apparatus connected through the connecting section as a request target which is requested to perform the predetermined process, on the basis of a predetermined condition.

According to still another embodiment, there is provided a program which causes a computer to execute functions including: a processing function which performs a predetermined process; a connecting function which is provided for connection with an external apparatus capable of performing the predetermined process through a communication network; and a selecting function which selects the processing section or the external apparatus connected through the connecting section as a request target which is requested to perform the predetermined process, on the basis of a predetermined condition.

According to still another embodiment, there is provided a computer readable recording medium in which the program is recorded.

According to the above-described embodiments, it is possible to appropriately select a processing subject depending on the circumstances of the terminal device.

BRIEF DESCRIPTION OF THE DRAWINGS

FIG. 6 is a diagram illustrating another example of the determination method according to the first embodiment;

FIG. 7 is a diagram illustrating a still another example of the determination method according to the first embodiment;

FIG. 8 is a diagram illustrating a further still another example of the determination method according to the first embodiment;

DETAILED DESCRIPTION OF EMBODIMENTS

Figure 1:
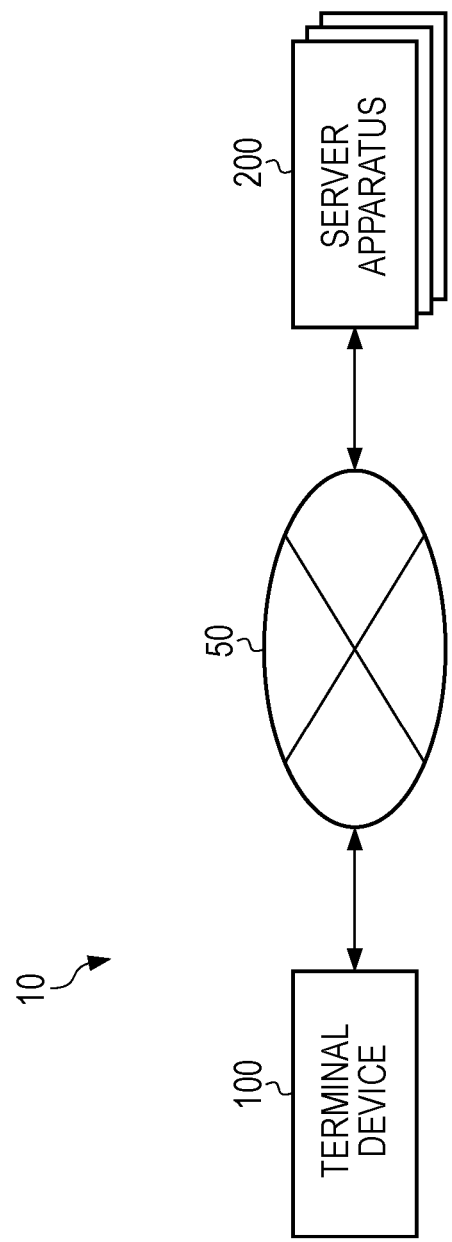
FIG. 1 is a diagram illustrating a configuration of an information processing system according to a first embodiment of the present disclosure.

Hereinafter, preferred embodiments will be described in detail with reference to the accompanying drawings. In the description and drawings, like reference numerals are given to like elements having substantially the same functional configuration, and detailed description thereof will be omitted.

[Description Flow]

Here, description flow regarding the embodiments disclosed below will be briefly described. First, a configuration of an information processing system 10 according to a first embodiment will be described with reference to FIG. 1. Then, a functional configuration of a terminal device 100 according to the first embodiment will be described with reference to FIG. 2. Then, a functional configuration of a server apparatus 200 according to the first embodiment will be described with reference to FIG. 3. Thereafter, an operation of the terminal device 100 will be described with reference to FIGS. 4 and 5.

Further, a determination method according to the first embodiment will be described with reference to FIGS. 6 to 8.

Next, a functional configuration of a terminal device 100 according to a second embodiment will be described with reference to FIG. 9. Then, a functional configuration of a server apparatus 200 according to the second embodiment will be described with reference to FIG. 10. Thereafter, an operation of the terminal device 100 according to the second embodiment will be described with reference to FIGS. 11 and 12.

Next, a functional configuration of a terminal device 100 according to a third embodiment will be described with reference to FIG. 13. Then, a functional configuration of a server apparatus 200 according to the third embodiment will be described with reference to FIG. 14. Further, detailed functional configurations of moving image generating sections 155 and 202 according to the third embodiment will be described with reference to FIG. 15. Thereafter, an operation of the terminal device 100 according to the third embodiment will be described with reference to FIGS. 16 and 17.

Next, a functional configuration of a terminal device 100 according to a fourth embodiment will be described with reference to FIG. 18. Then, a functional configuration of a server apparatus 200 according to the fourth embodiment will be described with reference to FIG. 19. Thereafter, an operation of the terminal device 100 according to the fourth embodiment will be described with reference to FIG. 20.

Next, a configuration of hardware capable of realizing functions of the terminal device 100 and the server apparatus 200 according to the respective embodiments will be described. Finally, technical concepts of the embodiments will be generally described, and then effects obtained from the technical concepts will be briefly described.

(Item Description)
1: First embodiment
   1-1: Functional configuration of information processing system 10
   1-2: Configuration of terminal device 100
   1-3: Functional configuration of server apparatus 200
   1-4: Operation of terminal device 100
      1-4-1: Overall process flow
      1-4-2: Determination method
2: Second embodiment
   2-1: Functional configuration of terminal device 100
   2-2: Functional configuration of server apparatus 200
   2-3: Operation of terminal device 100
      2-3-1: Overall process flow
      2-3-2: Determination method
3: Third embodiment
   3-1: Functional configuration of terminal device 100
   3-2: Functional configuration of server apparatus 200
   3-3: Operation of terminal device 100
      3-3-1: Overall process flow
      3-3-2: Moving image generation method
4: Fourth embodiment
   4-1: Functional configuration of terminal device 100
   4-2: Functional configuration of server apparatus 200
   4-3: Operation of terminal device 100
5: Hardware configuration
6: Conclusion 1: First Embodiment A first embodiment will be described hereinafter.
[1-1: Configuration of Information Processing System 10]
First, a configuration of an information processing system 10 according to this embodiment will be described with reference to FIG. 1. FIG. 1 is a diagram illustrating the configuration of the information processing system 10 according to this embodiment.

As shown in FIG. 1, the information processing system 10 mainly includes a terminal device 100 and a server apparatus 200. Further, the terminal device 100 and the server apparatus 200 are connected through a network 50. A plurality of server apparatuses 200 is disclosed in the example of FIG. 1, but the server apparatus 200 may be configured as a single system. Further, a system configuration may be employed in which a plurality of terminal devices 100 is connected to the network 50.

The terminal device 100 can communicate with the server apparatus 200 through the network 50. Further, the terminal device 100 can request the server apparatus 200 to perform a process for certain information, so that the server apparatus 200 can perform the process on behalf of the terminal device 100. For example, the terminal device 100 transmits image data to the server apparatus 200, and requests the server apparatus 200 to encode the image data. The server apparatus 200 which has received the request encodes the received image data and transmits the encoded image data to the terminal device 100. In many cases, the encoding of the image data is a process which significantly burdens the terminal device 100. However, after the server apparatus 200 performs the process on behalf of the terminal device 100, the terminal device 100 can make use of the processing result.

Further, the network 50 is not typically efficiently available. For example, when the network 50 is based on wireless communication, communication speed may be significantly reduced or communication may become difficult, according to environmental change. Further, even when the network 50 is constructed by a wired line, network traffic increases, and thus, an available band is limited or communication error frequently occurs, thereby resulting in reducing the communication speed. In a case where the communication environment is instable as described above, if the server apparatus 200 performs the process on behalf of the terminal device 100, a process time may increase due to a bottleneck of a communication time. In this case, by allowing the terminal device 100 having low processing capability to perform the process, it is possible to perform the process at high speed.

Further, the terminal device 100 may be driven using electric power stored in a battery. In this case, in a case where the server apparatus 200 performs the process, it is possible to suppress electric power consumed in the terminal device 100 at a lower level, compared with a case where the terminal device 100 performs the process. That is, by allowing the server apparatus 200 to perform the process, it is possible to extend the driving time of the terminal device 100 using the battery. Further, in a case where a processing load of the terminal device 100 is high, by allowing the server apparatus 200 to perform a part of the process, it is possible to more efficiently perform the process. For example, if the terminal device 100 performs a process of a low load and the server apparatus 200 performs a process of a high load, it is possible to more efficiently perform the process.

Further, a version of an algorithm used when a certain process is performed may be different between the terminal device 100 and the server apparatus 200. In a case where the latest algorithm is frequently stored in a server, an algorithm used in the server apparatus 200 is newer than an algorithm used in the terminal device 100. In such a case, by allowing the server apparatus 200 to perform the process, it is possible to obtain a processing result based on a new algorithm. For example, in a face recognition algorithm which automatically detects a face from an image, or the like, detection accuracy may be significantly different according to each version. That is, it is possible to detect the face with higher accuracy, by using a new face recognition algorithm.

As described above, a variety of advantages and disadvantages occur by allowing the server apparatus 200 to perform the process on behalf of the terminal device 100. Thus, a control method is obtained in which the server apparatus 200 performs the process in the case of more advantages, and the terminal device 100 performs the process in the case of more disadvantages or few advantages. In a general distributed computing system, there is an existing management method of distributing the process to a plurality of servers while maintaining load balance. However, the management method is not suitable for management of the information processing system 10 in which a communication environment changes from time to time, a power supply status of the terminal device 100 changes, or an algorithm is different between the terminal device 100 and the server apparatus 200.

Thus, the present inventor proposes a method of appropriately selecting a processing subject depending on the circumstances, by the terminal device 100 which is capable of allowing the server apparatus 200 to perform the process on behalf of the terminal device 100. Hereinafter, functional configurations of the terminal device 100 and the server apparatus 200 according to this embodiment, and a selection method of the processing subject according to this embodiment will be sequentially described.

[1-2: Functional Configuration of Terminal Device 100]

Figure 2:
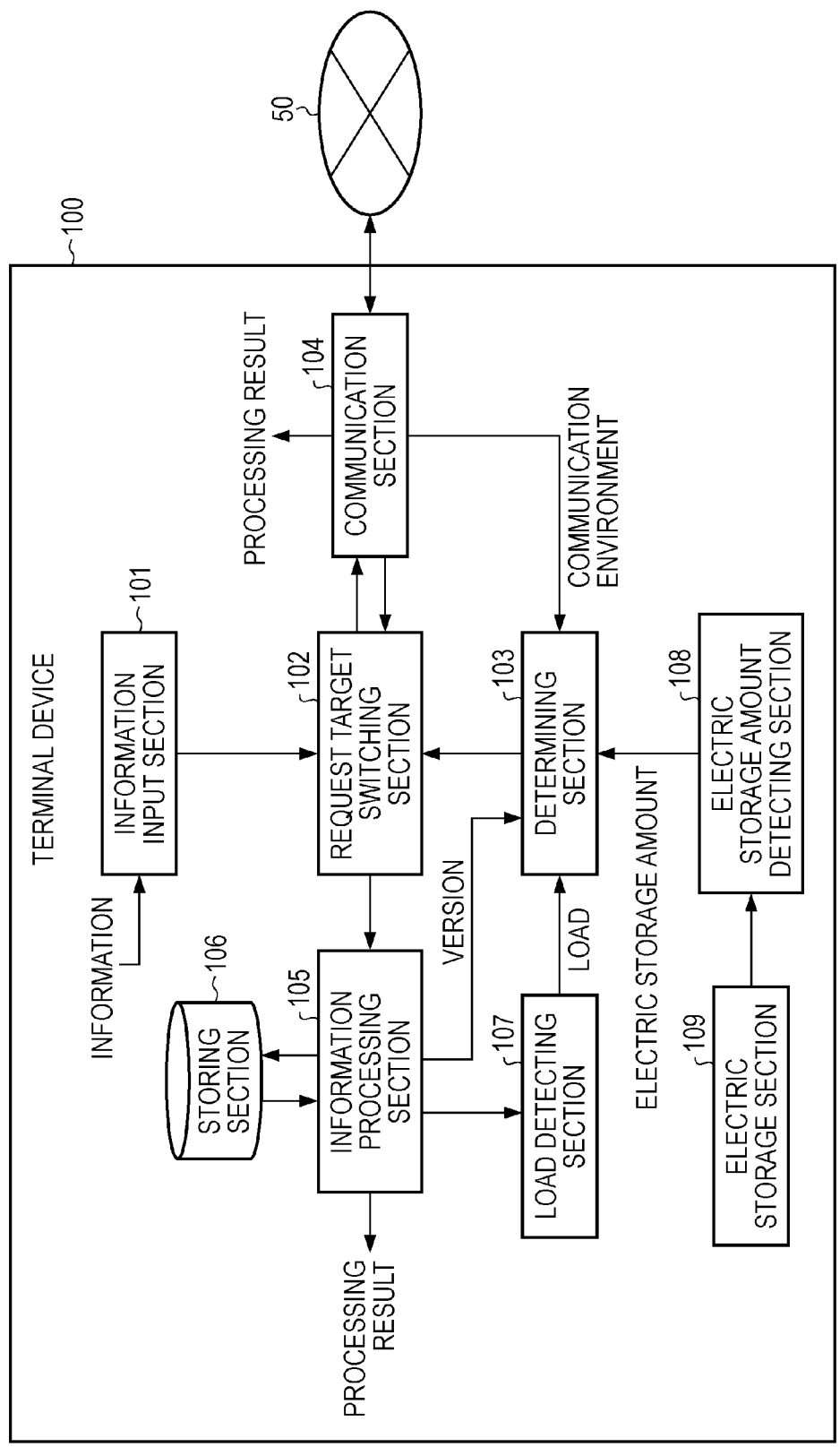
FIG. 2 is a diagram illustrating a functional configuration of a terminal device according to the first embodiment.

First, a functional configuration of the terminal device 100 according to this embodiment will be described with reference to FIG. 2. FIG. 2 is a diagram illustrating the functional configuration of the terminal device 100 according to this embodiment.

As shown in FIG. 2, the terminal device 100 mainly includes an information input section 101, a request target switching section 102, a determining section 103, a communicating section 104, an information processing section 105, a storing section 106, a load detecting section 107, an electric storage amount detecting section 108, and an electric storage section 109.

The information input section 101 is means for inputting information to be processed. The information input through the information input section 101 is input to the request target switching section 102. The request target switching section 102 is means for switching a request for the information processing section 105 to perform the process and a request for the server apparatus 200 to perform the process. Here, the request target switching section 102 switches the request target of the process according to the determination result in the determining section 103. The determining section 103 is means for determining the request target of the process according to the communication environment, the processing load, the electric storage amount and the version of an algorithm used in the process.

The communication environment is notified to the determining section 103 from the communicating section 104. Further, information indicating the load status of the information processing section 105 is input to the determining section 103 from the load detecting section 107. Further, information indicating the amount of electric storage of the electric storage section 109 is input to the determining section 103 from the electric storage section 108. Further, information indicating the version of the algorithm used in the process in the information processing section 105 is input to the determining section 103. If the above-described information is input, the determining section 103 determines whether the information processing section 105 or the server apparatus 200 is selected as the processing subject, on the basis of the input information. The determination result in the determining section 103 is input to the request target switching section 102.

In a case where the determination result in the determining section 103 indicates the information processing section 105, the request target switching section 102 inputs the information input from the information input section 101 to the information processing section 105. If the information is input, the information processing section 105 processes the input information on the basis of the algorithm stored in the storing section 106, and then outputs the processing result. When the process is performed, the information processing section 105 makes use of the storing section 106 as necessary. On the other hand, in a case where the determination result in the determining section 103 indicates the server apparatus 200, the request target switching section 102 inputs the information input from the information input section 101 to the communicating section 104. The communicating section 104 transmits the input information to the server apparatus 200 through the network 50. Further, the communicating section 104 receives the processing result transmitted from the server apparatus 200, and then outputs the processing result.

<<Function of Determining Section 103>>

Here, a function of the determining section 103 will be described in detail. As described above, the determining section 103 selects the processing subject on the basis of information on the communication environment input from the communicating section 104, information on the version input from the information processing section 105, information on the load input from the load detecting section 107, and information on the amount of electric storage input from the electric storage amount detecting section 108.

The communication environment information is information indicating whether the communication line is in an available state, indicating that the communication line is a low speed line or a high speed line, and indicating the level of an available bandwidth. The communication environment information is detected by the communicating section 104. Further, the load information is information indicating whether the load of the information processing section 105 is at a high level or at a low level. The load information is detected by the load detecting section 107. Further, the electric storage amount information is information indicating the amount of electric power stored in the electric storage section 109. The electric storage section 109 is means for storing electric power for driving respective components of the terminal 100. Further, the amount of electric power stored in the electric storage section 109 is detected by the electric power amount detecting section 108.

(Selection Based on Communication Environment)

For example, in a case where the communication line is not in the available state, the determining section 103 selects the information processing section 105 as the processing subject. Further, in a case where the low speed line is used, the determining section 103 selects the information processing section 105 as the processing subject. On the other hand, in a case where the high speed line is used, the determining section 103 selects the server apparatus 200 as the processing subject. Here, in a case where the available bandwidth is narrow even when the high speed line is used, the determining section 103 selects the information processing section 105 as the processing subject. Further, in a case where the load of the information processing section 105 is high or the electric storage amount of the electric storage section 109 is small even when the low speed line is used, the determining section 103 selects the server apparatus 200 as the processing subject. The information on the processing subject selected in this way is input to the request target switching section 102 as the determination result.

(Selection Based on Load)

For example, in a case where the load of the information processing section 105 is high, the determining section 103 selects the server apparatus 200 as the processing subject. On the other hand, in a case where the load of the information processing section 105 is low, the determining section 103 selects the information processing section 105 as the processing subject. Here, in a case where the communication line is not available even when the load of the information processing section 105 is high, the determining section 103 selects the information processing section 105 as the processing subject. Further, in a case where the amount of electric storage of the electric storage section 109 is small even when the load of the information processing section 105 is low, the determining section 103 selects the server apparatus 200 as the processing subject. Further, in a case where the algorithm used in the server apparatus 200 is new even when the load of the information processing section 105 is low, the determining section 103 selects the server apparatus 200 as the processing subject. The information on the processing subject selected in this way is input to the request target switching section 102 as the determination result.

(Selection Based on Electric Storage Amount)

For example, in a case where the electric storage amount of the electric storage section 109 is large, the determining section 103 selects the information processing section 105 as the processing subject. On the other hand, in a case where the electric storage amount of the electric storage section 109 is small, the determining section 103 selects the server apparatus 200 as the processing subject. Here, in a case where the load of the information processing section 105 is high even when the electric storage amount of the electric storage section 109 is large, the determining section 103 selects the server apparatus 200 as the processing subject. Further, in a case where the communication line is not available even when the electric storage amount of the electric storage section 109 is small, the determining section 103 selects the information processing section 105 as the processing subject. Further, in a case where the algorithm used in the server apparatus 200 is new even when the electric storage amount of the electric storage section 109 is large, the determining section 103 selects the server apparatus 200 as the processing subject. The information on the processing subject selected in this way is input to the request target switching section 102 as the determination result.

(Selection Based on Version)

For example, in a case where the algorithm used in the server apparatus 200 is new, the determining section 103 selects the server apparatus 200 as the processing subject. On the other hand, in a case where the algorithm used in the information processing section 105 and algorithm used in the server apparatus 200 are the same version, the determining section 103 selects the information processing section 105 as the processing subject. Here, in a case where the communication line is not available or the low speed line is used even when the algorithm used in the server apparatus 200 is new, the determining section 103 selects the information processing section 105 as the processing subject. Further, in a case where the load of the information processing section 105 is high or the electric storage amount of the electric storage section 109 is small even when the algorithm used in the information processing section 105 and the algorithm used in the server apparatus 200 are the same version, the determining section 103 selects the server apparatus 200 as the processing subject. The information on the processing subject selected in this way is input to the request target switching section 102 as the determination result.

<<Switching of Processing Subject>>

As described above, the determining section 103 may select the processing subject according to the communication environment, the load of the information processing section 105, the electric storage amount of the electric storage section 109 and the version used by the information processing section 105. Here, the communication environment, the load of the information processing section 105 and the electric storage amount of the electric storage section 109 change from time to time. Further, in the server apparatus 200, if the algorithm used for processing is updated, the version of the algorithm is also changed. In a case where these changes occur, the determining section 103 updates the determination result according to these changes. For example, in a case where the high speed line is not available and the communication line is switched to the low speed line, the determining section 103 inputs the processing result that the processing subject is changed to the information processing section 105 from the server apparatus 200, to the request target switching section 102.

If the processing result after the change is input, the request target switching section 102 stops input of information through the information input section 101. Then, the request target switching section 102 obtains information necessary for the information processing section 105 to continue the process from the server apparatus 200. For example, in a case where a certain type of moving image is processed, when correlation is expected in the information continuously input from the information input section 101, the previously input information may be necessary in order to process information which is input the next time. In such a case, it is necessary to obtain the previously input correlative information from the server apparatus 200, and to input the information to the information processing section 105. Thus, the information obtained from the server apparatus 200 by the request target switching section 102 is input to the information processing section 105.

If the necessary information is input to the information processing section 105, the request target switching section 102 restarts input of the information through the information input section 101. Further, the request target switching section 102 inputs the information input through the information input section 101 to the information processing section 105 to perform the process.

A configuration in which the correlative information is obtained from the server apparatus 200 is described, but a method may be considered in which a series of correlative information is all processed by the server apparatus 200 and then the processing subject is switched. For example, the request target switching section 102 transmits the series of correlative information to the server apparatus 200 and then stops input of the information through the information input section 101 at a timing when the transmission is terminated. Then, the request target switching section 102 notifies the server apparatus 200 of the timing when a certain series of correlative information is completely processed, and then restarts input of information through the information input section 101 according to the notification. Further, the request target switching section 102 inputs the information input from the information input section 101 to the information processing section 105 to perform the process.

In this way, when the processing subject is switched, the information input through the information input section 101 is temporarily stopped and the process is completed up to a satisfactory separation point before switching, and thus, the process may be completed without losing its continuity even when the processing subject is switched. That is, it is possible to prevent processing leakage from occurring according to the switching of the processing subject, or discordance in the processing result. More specifically, in the case of the moving image process, the satisfactory separation point corresponds to a case where for example, the previous position is switched and the correlation between the image input so far and the newly input image is not expected.

Hereinbefore, the functional configuration of the terminal device 100 has been described.

[1-3: Functional Configuration of Server Apparatus 200]

Figure 3:
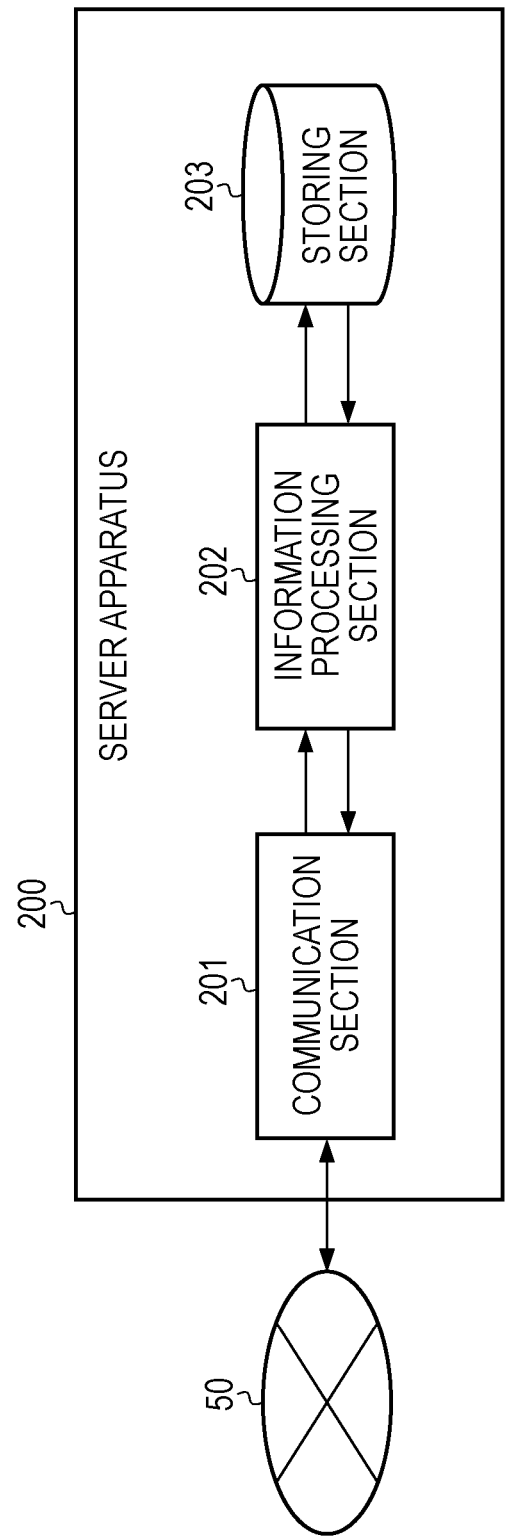
FIG. 3 is a diagram illustrating a functional configuration of a server apparatus according to the first embodiment.

Next, a functional configuration of the server apparatus 200 according to this embodiment will be described with reference to FIG. 3. FIG. 3 is a diagram illustrating the functional configuration of the server apparatus 200 according to this embodiment.

As shown in FIG. 3, the server apparatus 200 mainly includes a communicating section 201, an information processing section 202 and a storing section 203. The plurality of server apparatuses 200 is disclosed in the information processing system 10 shown in FIG. 1, but the plurality of server apparatuses 200 is assumed to have substantially the same configuration as the server apparatus 200 shown in FIG. 3.

As described above, if the server apparatus 200 is selected by the terminal device 100 as the processing subject, information to be processed is transmitted to the server apparatus 200 from the terminal device 100. The information to be processed which is transmitted from the terminal device 100 is transmitted to the server apparatus 200 through the network 50, and is then received by the communicating section 201. If the information to be processed is received, the communicating section 201 inputs the received information to be processed to the information processing section 202.

If the information to be processed is input, the information processing section 202 processes the input information to be processed on the basis of an algorithm stored in the storing section 203, and outputs the processing result. When the process is performed, the information processing section 202 makes use of the storing section 203 as necessary. The processing result output from the information processing section 202 is input to the communication section 201. If the processing result is input, the communicating section 201 transmits the input result to the terminal device 100 through the network 50.

Further, when receiving an inquiry about a version of an algorithm from the terminal device 100, the server apparatus 200 notifies the terminal device 100 of the version of the algorithm used in the process by the information processing section 202. First, if the inquiry is input through the network 50, the communicating section 201 receives the inquiry, and then notifies the information processing section 202 of the inquiry. The information processing section 202 which has received the inquiry confirms the version of the algorithm used in the process, and then inputs information indicating the version to the communicating section 201. If the information indicating the version is input, the communicating section 201 transmits the information indicating the version to the terminal device 100 through the network 50.

Hereinbefore, the functional configuration of the server apparatus 200 has been described.

[1-4: Operation of Terminal Device 100]

Figure 4:
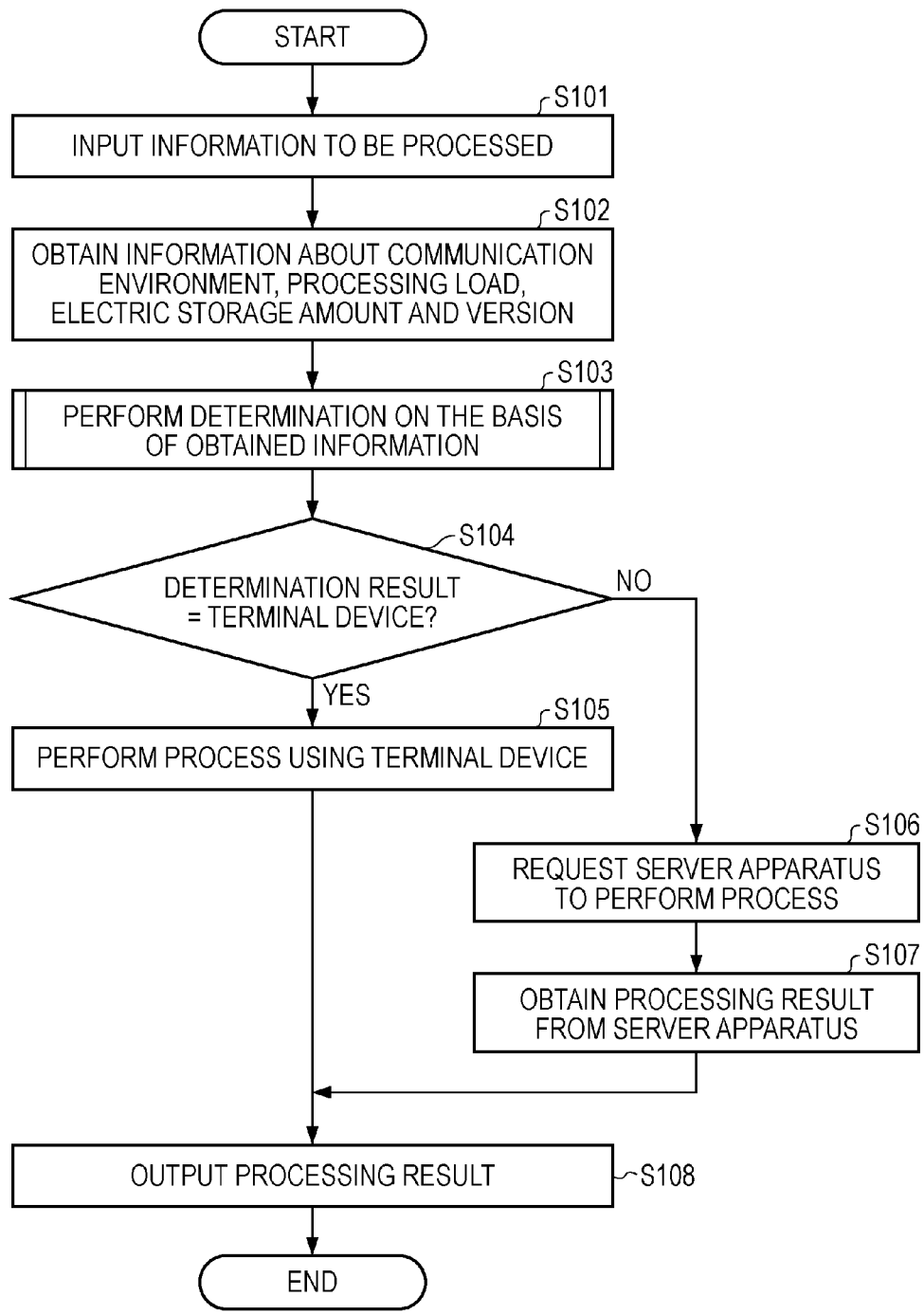
FIG. 4 is a diagram illustrating an operation of the terminal device according to the first embodiment.
Figure 5:
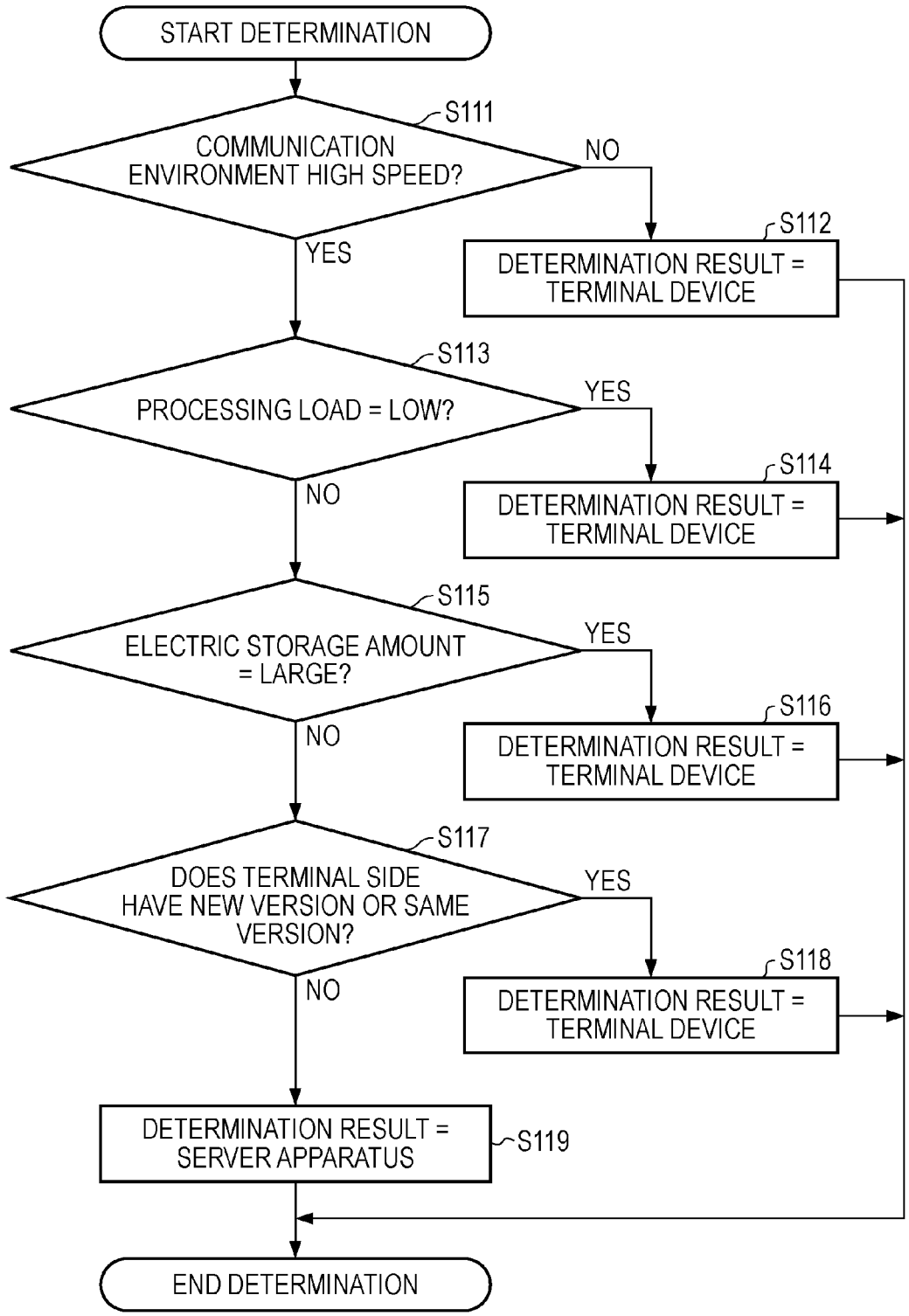
FIG. 5 is a diagram illustrating an example of a determination method according to the first embodiment.

Next, an operation of the terminal device 100 according to this embodiment will be described with reference to FIGS. 4 and 5. FIGS. 4 and 5 are diagrams illustrating the operation of the terminal device 100 according to this embodiment.

(1-4-1: Overall Process Flow)

First, an overall process flow in the terminal device 100 will be described.

As shown in FIG. 4, the information to be processed is firstly input through the information input section 101 (S101). If the information to be processed is input, the terminal device 100 obtains the communication environment information from the communicating section 104, obtains the load information from the load detecting section 107, obtains the electric storage amount information from the electric storage section 108, and obtains the version information from the information processing section 105 (S102). Then, the terminal device 100 determines whether the information processing section 105 (terminal device 100) or the server apparatus 200 is selected as the processing subject of the information to be processed, using the function of the determining section 103 (S103). The terminal device 100 confirms the determination result, and determines whether the information processing section 105 is selected as the processing subject (determination result=terminal device) (S104).

In a case where the information processing section 105 is selected as the processing subject (determination result=terminal device), the terminal device 100 allows the routine to proceed to step S105. On the other hand, in a case where the server apparatus 200 is selected as the processing subject (determination result=server apparatus), the terminal device 100 allows the routine to proceed to step S106. If the routine proceeds to step S105, the terminal device 100 inputs the information to be processed to the information processing section 105 using the function of the request target switching section 102 (S105). If the information to be processed is input, the information processing section 105 performs the process for the input information to be processed. After performing the process using the function of the information processing section 105, the terminal device 100 allows the routine to proceed to step S108.

On the other hand, in a case where the routine proceeds to step S106, the terminal device 100 requests the server apparatus 200 to perform the process for the information to be processed, using the function of the request target switching section 102 (S106). At this time, the terminal device 100 transmits the information to be processed to the server apparatus 200 using the function of the communicating section 104. The server apparatus 200 which has received the information to be processed performs the process for the received information to be processed using the function of the information processing section 202. The processing result in the server apparatus 200 is transmitted to the terminal device 100 through the network 50. The terminal device 100 receives the processing result from the server apparatus 200 using the function of the communicating section 104 (S107), and then allows the routine to proceed to step S108.

If the routine proceeds to step S108, the terminal device 100 outputs the processing result performed using the function of the information processing section 105 or the processing result received by the communicating section 104 (S108).

Hereinbefore, the overall process flow through the terminal device 100 has been described.

(1-4-2: Determination Method)

Next, a determination method through the determining section 103 (step S103) will be described in detail.

As shown in FIG. 5, if the determination operation is started, the determining section 103 determines whether the communication environment is high speed (S111). For example, the determining section 103 determines whether the available communication line is a low speed line or a high speed line, the communication line is available, the bandwidth is narrow or wide, and the like, and determines whether a substantially high speed communication is available. In a case where the communication line is the low speed line or the communication line is not available, the determining section 103 determines that the communication environment is not high speed (communication environment≠high speed). Further, in a case where the bandwidth is narrow even when the high speed line is available, the determining section 103 determines that the communication environment is not high speed. On the other hand, in a case where the high speed line is available and the bandwidth is wide, the determining section 103 determines that the communication environment is high speed.

If it is determined that the communication environment is not high speed, the determining section 103 allows the routine to proceed to step S112. On the other hand, if it is determined that the communication environment is high speed, the determining section 103 allows the routine to proceed to step S113. In a case where the routine proceeds to step S112, the determining section 103 selects the information processing section 105 as the processing subject (S112, determination result=terminal device), and then terminates the series of processes. On the other hand, in a case where the routine proceeds to step S113, the determining section 103 determines whether the processing load of the information processing section 105 is low (S113). If the processing load is low, the determining section 103 allows the routine to proceed to step S114. On the other hand, if the processing load is high, the determining section 103 allows the routine to proceed to step S115.

In a case where the routine proceeds to step S114, the determining section 103 selects the information processing section 105 as the processing subject (S114, determination result=terminal device), and then terminates the series of processes. On the other hand, in a case where the routine proceeds to step S115, the determining section 103 determines whether the amount of electric storage of the electric storage section 109 is larger than a predetermined amount (S115). If the amount of electric storage is larger than the predetermined amount, the determining section 103 allows the routine to proceed to step S116. On the other hand, if the amount of electric storage is smaller than the predetermined amount, the determining section 103 allows the routine to proceed to step S117. In a case where the routine proceeds to step S116, the determining section 103 selects the information process section 105 as the processing subject (S116, determination result=terminal device), and terminates the series of processes.

On the other hand, in a case where the routine proceeds to step S117, the determining section 103 compares the version of the algorithm used in the process by the information processing section 105 and the version of the algorithm used in the process by the server apparatus 200 (S117). In a case where the version of the algorithm used in the process by the server apparatus 200 is the same as or newer than the version of the algorithm used in the process by the information processing section 105, the determining section 103 allows the routine to proceed to step S119. On the other hand, in a case where the version of the algorithm used in the process by the server apparatus 200 is older than the version of the algorithm used in the process by the information processing section 105, the determining section 103 allows the routine to proceed to step S118.

In a case where the routine proceeds to step S118, the determining section 103 selects the information processing section 105 as the processing subject (S118, determination result=terminal device), and then terminates the series of processes. On the other hand, in a case where the routine proceeds to step S119, the determining section 103 selects the server apparatus 200 as the processing subject (S119, determination result=server apparatus), and then terminates the series of processes. The order of steps S111, S113, S115 and S117 may be arbitrarily changed. That is, the process flow in FIG. 5 is an example, and thus the determination process relating to the communication environment, the processing load, the electric storage amount and the version may be performed in an arbitrary order. Further, it is not necessary to perform all the processes of steps S111, S113, S115 and S117, and one or more of the processes may be selectively performed. In this case, it is also possible to appropriately select the processing subject depending on the circumstances of the terminal device. Here, repetitive description of all patterns is omitted for simplicity of description.

In the example of FIG. 5, in a case where the communication environment is the high speed, the determination method is determined so that the server apparatus 200 is selected as the processing subject. However, the server apparatus 200 may be efficiently used even when the communication environment is not the high speed, depending on the circumstances. Contrarily, the information processing section 105 may be efficiently used even when the communication environment is the high speed, depending on the circumstances. Thus, the determination method in the determining section 103 may be configured as shown in FIGS. 6 to 8.

(First Determination Method: Combination of Communication Environment and Electric Storage Amount)

First, description will be made with reference to FIG. 6. The example of FIG. 6 is based on the assumption that the processing load is low and the algorithm versions used in the information processing section 105 and the server apparatus 200 are the same.

In a case where the communication line is not available, it is not possible to utilize the server apparatus 200. Thus, in a case where the communication environment is unavailable for communication, the determining section 103 selects the information processing section 105 as the processing subject (determination result=terminal device). Further, in a case where the communication line is high speed, it is possible to utilize the server apparatus 200 at a low communication cost. In this case, it may be efficient to utilize the server apparatus 200. For example, by utilizing the server apparatus 200, it is possible to reduce power consumption. Thus, the determining section 103 selects the server apparatus 200 as the processing subject (determination result=server apparatus).

On the other hand, in a case where the communication line is the low speed line, the communication cost is high compared with the case where the high speed line is used. For example, compared with the case where the high speed line is used, the communication time generated when information is transmitted to and received from the server apparatus 200 is long. It is possible to complete the process in a short time by the server apparatus 200 having high processing capability compared with the case where the information processing section 105 performs the process, but in a case where the communication time is long, it is possible to complete the process in a shorter time by the information processing section 105. Here, in a case where the information processing section 105 performs the process, the electric storage amount of the electric storage section 109 is more rapidly reduced.

Thus, in the example of FIG. 6, in a case where the communication environment is low speed, when the electric storage amount is larger than the predetermined amount, the information processing section 105 is selected as the processing subject (determination result=terminal device), and when the electric storage amount is smaller than the predetermined amount, the server apparatus 200 is selected as the processing subject (determination result=server apparatus). With such a configuration, in a case where the electric storage amount is small, it is possible to extend the time when driving is available using electric power stored in the electric storage section 109. On the other hand, in a case where the electric storage amount is large, it is possible to obtain the processing result in a short time. In a similar way to the case where the electric storage amount is large, even when an external power source is connected to the terminal device 100, the same determination result as in the case where the electric storage amount is large is obtained.

(Second Determination Method: Combination of Communication Environment and Processing Load)

Next, description will be made with reference to FIG. 7. The example of FIG. 7 is based on the assumption that the electric storage amount is large and the versions of the algorithm used in the information processing section 105 and the server apparatus 200 are the same.

If the communication line is not available, it is not possible to utilize the server apparatus 200. Thus, in a case where the communication environment is unavailable communication, the determining section 103 selects the information processing section 105 as the processing subject (determination result=terminal device). Further, in a case where the communication line is the high speed line, it is possible to utilize the server apparatus 200 at a low communication cost. In this case, it may be efficient to use the server apparatus 200. For example, by using the server apparatus 200, it is possible to reduce the power consumption. Thus, the determining section 103 selects the server apparatus 200 as the processing subject (determination result=server apparatus).

On the other hand, in a case where the communication line is the low speed line, the communication cost is high compared with the case where the high speed line is used. For example, compared with the case where the high speed line is used, the communication time generated when information is transmitted to and received from the server apparatus 200 is long. It is possible to complete the process in a short time by the server apparatus 200 having high processing capability compared with the case where the information processing section 105 performs the process, but in a case where the communication time is long, it is possible to complete the process in a short time by the information processing section 105. Here, in a case where the processing load of the information processing section 105 is high, if the information processing section 105 performs the process, a long time is taken until the process is completed.

Thus, in the example of FIG. 7, in a case where the communication environment is low speed, when the processing load is high, the server apparatus 200 is selected as the processing subject (determination result=server apparatus), and when the processing load is low, the information processing section 105 is selected as the processing subject (determination result=terminal device). With such a configuration, by selecting the processing subject capable of efficiently performing the process depending on the circumstances, it is possible to reduce the time necessary for obtaining the processing result.

(Third Determination Method: Combination of Communication Environment and Version)

Next, description will be made with reference to FIG. 8. The example of FIG. 8 is based on the assumption that the processing load is low and the electric storage amount is large.

In a case where the communication line is not available, it is not possible to utilize the server apparatus 200. Thus, in a case where the communication environment is unavailable communication, the determining section 103 selects the information processing section 105 as the processing subject (determination result=terminal device). Further, in a case where the communication line is the high speed line, it is possible to utilize the server apparatus 200 at a low communication cost. In this case, it may be efficient to use the server apparatus 200. For example, by using the server apparatus 200, it is possible to reduce the power consumption. Here, in a case where the processing capability of the information processing section 105 is high, the process may be efficiently performed by utilizing the information processing section 105, compared with the case where the server apparatus 200 is utilized, to the extent that the communication costs are able to be eliminated.

However, the algorithm used by the server apparatus 200 may be newer than the algorithm used by the information processing section 105. The new algorithm is configured to utilize a new function or to achieve an efficient process. Thus, it is more preferable to use the new algorithm than the old algorithm. Here, when the new algorithm is used, the capability of the processing subject may be inquired. For example, when the processing capability of the information processing section 105 or the storage capacity of the storing section 106 which stores the new algorithm is not sufficient, the new algorithm may not be used in the information processing section 105.

In many cases, a newly developed algorithm is supplied to the terminal device 100 from the server apparatus 200, but the new algorithm may not be applied to the terminal device 100 for the above-described reason. In such a case, it is preferable that the terminal device 100 allows the server apparatus 200 to perform the process on behalf of the information processing section 105. Thus, in the example of FIG. 8, in a case where the version of the algorithm used by the server apparatus 200 is new (server>terminal), the server apparatus 200 is positively used if communication is available. With such a configuration, it is possible to perform the process using the new algorithm, even in the terminal device 100 which is not able to utilize the new algorithm.

Hereinbefore, the determination method in the terminal device 100 has been described.

Hereinbefore, the first embodiment of the disclosure is described. As described above, by applying the technique according to this embodiment, it is possible to appropriately switch the processing subject depending on the circumstances of the terminal device 100. As a result, it is possible to efficiently perform the information, which results in high speed processing and power saving.

2: Second Embodiment

Next, a second embodiment of the disclosure will be described. A configuration of an information processing system 10 according to this embodiment is substantially the same as the configuration of the information processing system 10 according to the first embodiment, and thus description thereof will be omitted. In addition, detailed description of substantially the same elements as in the first embodiment will be omitted.

[2-1: Functional Configuration of Terminal Device 100]

First, a functional configuration of a terminal device 100 according to this embodiment will be described with reference to FIG. 9. FIG. 9 is a diagram illustrating the functional configuration of the terminal device 100 according to this embodiment.

Figure 9:
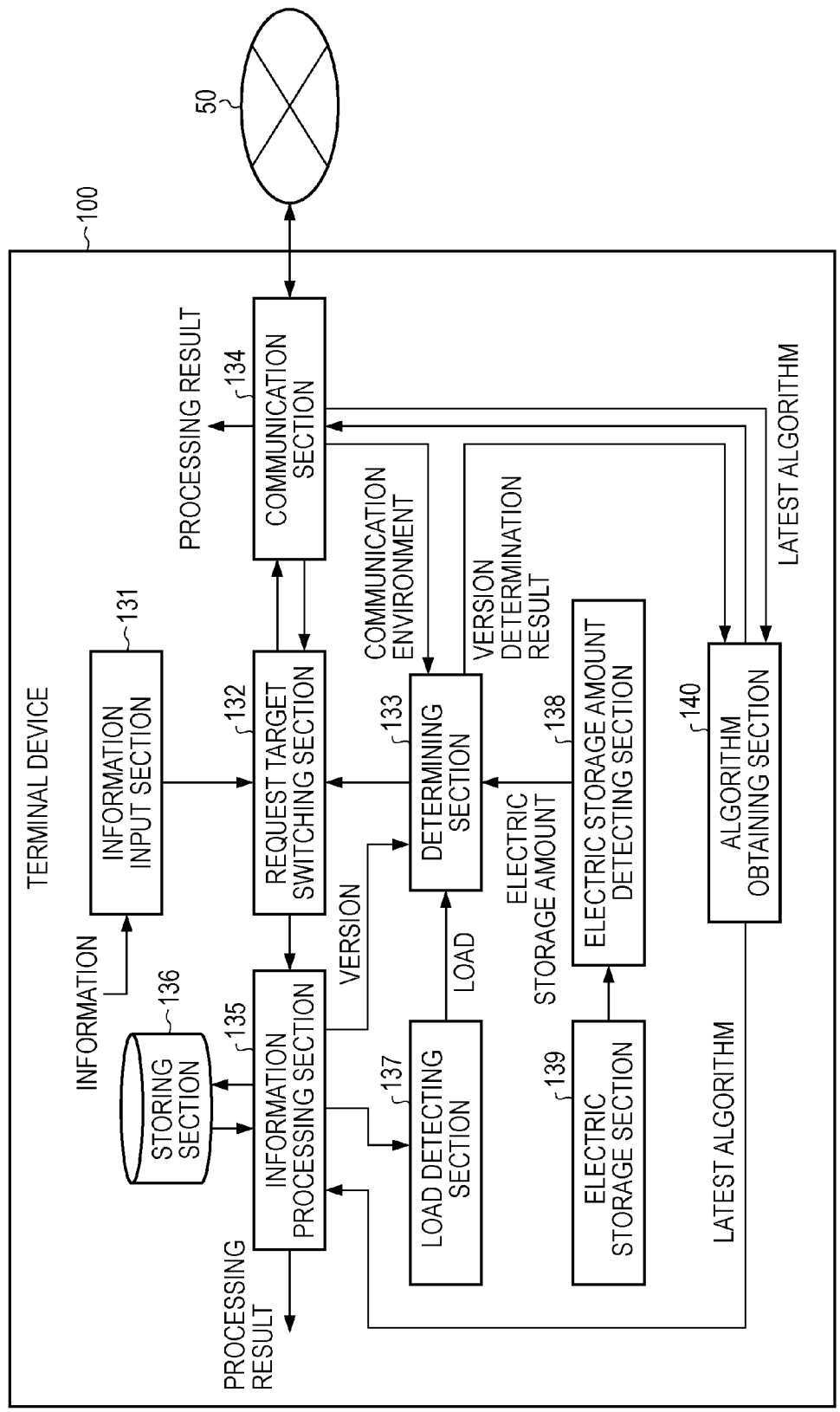
FIG. 9 is a diagram illustrating a functional configuration of a terminal device according to a second embodiment of the disclosure.

As shown in FIG. 9, the terminal device 100 mainly includes an information input section 131, a request target switching section 132, a determining section 133, a communicating section 134, an information processing section 135, a storing section 136, a load detecting section 137, an electric storage amount detecting section 138, an electric storage section 139, and an algorithm obtaining section 140.

The information input section 131 is means for inputting information to be processed. The information input through the information input section 131 is input to the request target switching section 132. The request target switching section 132 is means for switching a request for the information processing section 135 to perform the process for the input information and a request for the server apparatus 200 to perform the process. Here, the request target switching section 132 switches the request target of the process according to the determination result in the determining section 133. The determining section 133 is means for determining the request target of the process according to the communication environment, the processing load and the electric storage amount.

The communication environment is notified to the determining section 133 from the communicating section 134. Further, information indicating the load status of the information processing section 135 is input to the determining section 133 from the load detecting section 137. Further, information indicating the electric storage amount of the electric storage section 139 is input to the determining section 133 from the electric storage amount detecting section 138. Further, information indicating the version of the algorithm used in the process in the information processing section 135 is input to the determining section 133. If the above-described information is input, the determining section 133 determines whether the information processing section 135 or the server apparatus 200 is selected as the processing subject, on the basis of the input information. The determination result in the determining section 133 is input to the request target switching section 132.

In a case where the determination result in the determining section 133 indicates the information processing section 135, the request target switching section 132 inputs the information input from the information input section 131 to the information processing section 135. If the information is input, the information processing section 135 processes the input information on the basis of the algorithm stored in the storing section 136, and then outputs the processing result. When the process is performed, the information processing section 135 makes use of the storing section 136 as necessary. On the other hand, in a case where the determination result in the determining section 133 indicates the server apparatus 200, the request target switching section 132 inputs the information input from the information input section 131 to the communicating section 134. The communicating section 134 to which the information is input transmits the input information to the server apparatus 200 through the network 50. Further, the communicating section 134 receives the processing result transmitted from the server apparatus 200, and then outputs the processing result.

Further, the determining section 133 compares the version of the algorithm used by the information processing section 135 and the version of the algorithm used by the server apparatus 200. In a case where the algorithm used in the process by the server apparatus 200 is new compared with the algorithm used by the information processing section 135, the determining section 133 inputs the comparison result to the algorithm obtaining section 140. If the comparison result is input, the algorithm obtaining section 140 makes a request of the latest algorithm to the server apparatus 200 through the communicating section 134. If the latest algorithm is transmitted from the server apparatus 200 according to the request, the algorithm obtaining section 140 receives the latest algorithm through the communicating section 134.

If the latest algorithm is received, the algorithm obtaining section 140 inputs the received latest algorithm to the information processing section 135, and updates the algorithm in the information processing section 135. If the latest algorithm is received, the information processing section 135 updates the algorithm stored in the storing section 136 into the latest algorithm. In this way, by updating the algorithm according to the comparison result of the version, it is also possible for the information processing section 135 to perform the process using the latest algorithm.

Hereinbefore, the functional configuration of the terminal device 100 according to this embodiment has been described. Since the determination process of the determining section 133 is substantially the same as the determination process of the determining section 103 according to the first embodiment, detailed description about the determination process of the determining section 133 is omitted.

[2-2: Functional Configuration of Server Apparatus 200]

Figure 10:
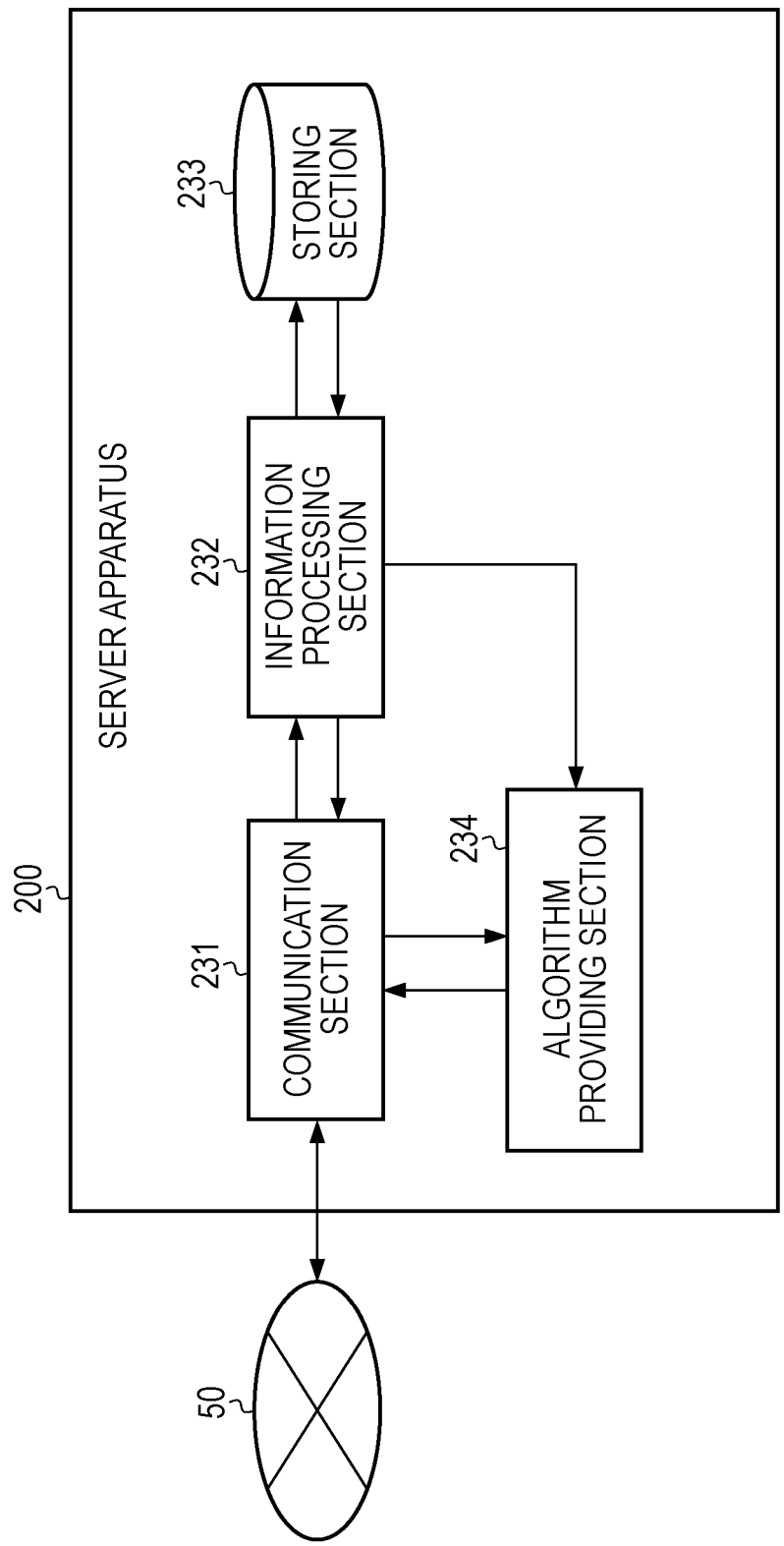
FIG. 10 is a diagram illustrating a functional configuration of a server apparatus according to the second embodiment.

Next, a functional configuration of the server apparatus 200 according to this embodiment will be described with reference to FIG. 10. FIG. 10 is a diagram illustrating the functional configuration of the server apparatus 200 according to this embodiment.

As shown in FIG. 10, the server apparatus 200 mainly includes a communicating section 231, an information processing section 232, a storing section 233, and an algorithm providing section 234. The plurality of server apparatuses 200 is disclosed in the information processing system 10 shown in FIG. 1, but all the plurality of server apparatuses 200 is assumed to have substantially the same configuration as the server apparatus 200 shown in FIG. 10.

As described above, if the server apparatus 200 is selected by the terminal device 100 as the processing subject, information to be processed is transmitted to the server apparatus 200 from the terminal device 100. The information to be processed which is transmitted from the terminal device 100 is transmitted to the server apparatus 200 through the network 50, and is received by the communicating section 231. If the information to be processed is received, the communicating section 231 inputs the received information to be processed to the information processing section 232.

If the information to be processed is input, the information processing section 232 processes the input information to be processed on the basis of an algorithm stored in the storing section 233, and outputs the processing result. When the process is performed, the information processing section 232 makes use of the storing section 233 as necessary. The processing result output by the information processing section 232 is input to the communicating section 231. If the processing result is input, the communicating section 231 transmits the input processing result to the terminal device 100 through the network 50.

Further, when receiving an inquiry about a version of an algorithm from the terminal device 100, the server apparatus 200 notifies the terminal device 100 of the version of the algorithm used in the process by the information processing section 232. First, if the inquiry is input through the network 50, the communicating section 231 receives the inquiry, and then notifies the information processing section 232 of the inquiry. The information processing section 232 which has received the inquiry confirms the version of the algorithm used in the process, and then inputs information indicating the version to the communicating section 231. If the information indicating the version is input, the communicating section 231 transmits the information indicating the version to the terminal device 100 through the network 50.

Further, in a case where the latest algorithm is necessary for the terminal device 100, the request from the device 100 is notified to the algorithm providing section 234 through the communicating section 231. If the notification is received, the algorithm providing section 234 obtains the latest algorithm from the information processing section 232. Further, the algorithm providing section 234 provides the obtained latest algorithm to the terminal device 100 through the communicating section 231.

Hereinbefore, the functional configuration of the server apparatus 200 has been described.

[2-3: Operation of Terminal Device 100]

Figure 11:
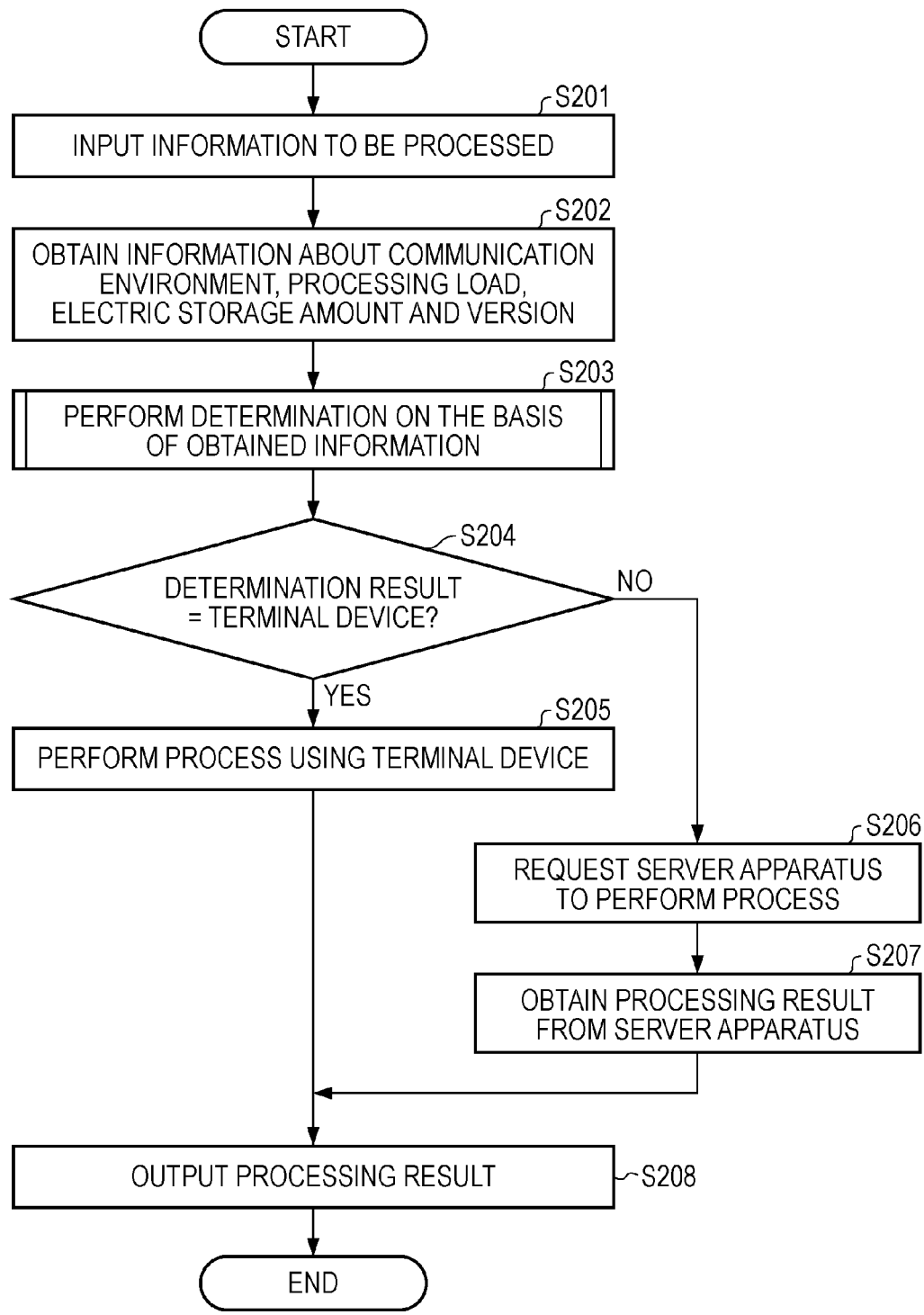
FIG. 11 is a diagram illustrating an operation of the terminal device according to the second embodiment.
Figure 12:
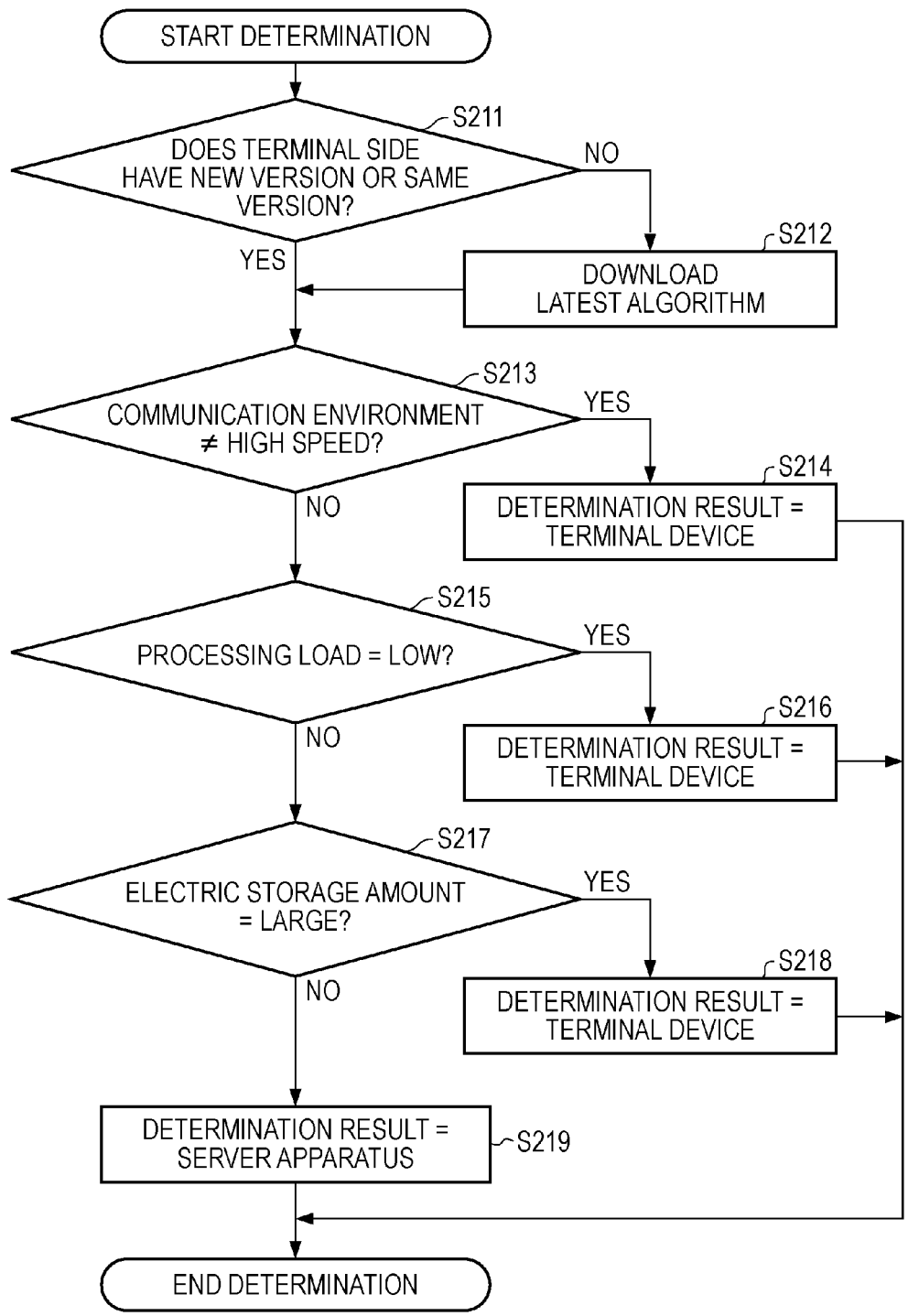
FIG. 12 is a diagram illustrating an example of a determination method according to the second embodiment.

Next, an operation of the terminal device 100 according to this embodiment will be described with reference to FIGS. 11 and 12. FIGS. 11 and 12 are diagrams illustrating the operation of the terminal device 100 according to this embodiment.

(2-3-1: Overall Process Flow)

First, an overall process flow in the terminal device 100 will be described.

As shown in FIG. 11, first, information to be processed is input through the information input section 131 (S201). If the information to be processed is input, the terminal device 100 obtains the communication environment information from the communicating section 134, obtains the load information from the load detecting section 137, obtains the electric storage amount information from the electric storage amount detecting section 138, and obtains the version information from the information processing section 135 (S202). Then, the terminal device 100 determines whether the information processing section 135 (terminal device 100) or the server apparatus 200 is selected as the processing subject of the information to be processed, using the function of the determining section 133 (S203). The terminal device 100 confirms the determination result, and determines whether the information processing section 135 is selected as the processing subject (determination result=terminal device) (S204).

In a case where the information processing section 135 is selected as the processing subject (determination result=terminal device), the terminal device 100 allows the routine to proceed to step S205. On the other hand, in a case where the server apparatus 200 is selected as the processing subject (determination result=server apparatus), the terminal device 100 allows the routine to proceed to step S206. When the routine proceeds to step S205, the terminal device 100 inputs the information to be processed to the information processing section 135 using the function of the request target switching section 132 (S205). If the information to be processed is input, the information processing section 135 performs the process for the input information to be processed. The terminal device 100 which performs the process using the function of the information processing section 135 allows the routine to proceed to step S208.

On the other hand, in a case where the routine proceeds to step S206, the terminal device 100 requests the server apparatus 200 to perform the process for the information to be processed, using the function of the request target switching section 132 (S206). At this time, the terminal device 100 transmits the information to be processed to the server apparatus 200 using the function of the communicating section 134. The server apparatus 200 which has received the information to be processed performs the process for the received information to be processed, using the function of the information processing section 202. The processing result in the server apparatus 200 is transmitted to the terminal device 100 through the network 50. The terminal device 100 receives the processing result from the server apparatus 200 using the function of the communicating section 134 (S207), and then allows the routine to proceed to step S208.

If the routine proceeds to step S208, the terminal device 100 outputs the processing result performed using the function of the information processing section 135 or the processing result received by the communicating section 134 (S208).

Hereinbefore, the overall process flow of the terminal device 100 has been described.

(2-3-2: Determination Method)

Next, a determination method in the determining section 203 (step S203) will be described in detail.

As shown in FIG. 12, if the determination operation is started, the determining section 133 compares the version of the algorithm used in the process by the information processing section 135 with the version of the algorithm used in the process by the server apparatus 200 (S211). In a case where the version of the algorithm used in the process by the information processing section 135 is the same as or newer than the version of the algorithm used in the process by the server apparatus 200, the determining section 133 allows the routine to proceed to step S213. On the other hand, in a case where the version of the algorithm used in the process by the information processing section 135 is older than the version of the algorithm used in the process by the server apparatus 200, the determining section 133 allows the routine to proceed to step S212. In a case where the routine proceeds to step S212, the terminal device 100 downloads the latest algorithm from the server apparatus 200 using the function of the algorithm obtaining section 140, and then allows the routine to proceed to step S213.

Then, the determining section 133 determines whether the communication environment is high speed (S213). For example, the determining section 133 determines whether the available communication line is a low speed line or a high speed line, the communication line is available, the bandwidth is narrow or wide, and the like, and determines whether substantially high speed communication is available. In a case where the communication line is the low speed line or the communication line is not available, the determining section 133 determines that the communication environment is not high speed (communication environment≠high speed). Further, in a case where the bandwidth is narrow even when the high speed line is available, the determining section 103 determines that the communication environment is not high speed. On the other hand, in a case where the high speed line is available and the bandwidth is wide, the determining section 133 determines that the communication environment is high speed.

In a case where it is determined that the communication environment is not high speed, the determining section 133 allows the routine to proceed to step S214. On the other hand, in a case where it is determined that the communication environment is high speed, the determining section 133 allows the routine to proceed to step S215. In a case where the routine proceeds to step S214, the determining section 133 selects the information processing section 135 as the processing subject (S214, determination result=terminal device), and then terminates the series of processes. On the other hand, in a case where the routine proceeds to step S215, the determining section 133 determines whether the processing load of the information processing section 135 is low (S215). If the processing load is low, the determining section 133 allows the routine to proceed to step S216. On the other hand, if the processing load is high, the determining section 133 allows the routine to proceed to step S217.

In a case where the routine proceeds to step S216, the determining section 103 selects the information processing section 135 as the processing subject (S216, determination result=terminal device), and then terminates the series of processes. On the other hand, in a case where the routine proceeds to step S217, the determining section 133 determines whether the electric storage amount of the electric storage section 139 is larger than a predetermined amount (S217). If the electric storage amount is larger than the predetermined amount, the determining section 133 allows the routine to proceed to step S218. On the other hand, if the electric storage amount is smaller than the predetermined amount, the determining section 133 allows the routine to proceed to step S219. In a case where the routine proceeds to step S218, the determining section 133 selects the information processing section 135 as the processing subject (S218, determination result=terminal device), and then terminates the series of process.

On the other hand, in a case where the routine proceeds to step S219, the determining section 133 selects the server apparatus 200 as the processing subject (S219, determination result=server apparatus), and then terminates the series of processes. The order of steps S211, S213, S215 and S217 may be arbitrarily changed. That is, the process flow in FIG. 12 is an example, and thus the determination process relating to the communication environment, the processing load, the electric storage amount and the version may be performed in an arbitrary order. Further, it is not necessary to perform all the processes of steps S211, S213, S215 and S217, and one or more of the processes may be selectively performed. In this case, it is also possible to appropriately select the processing subject depending on the circumstances of the terminal device. Here, repetitive description about all patterns is omitted for simplicity of description.

Hereinbefore, the determination method in the terminal device 100 has been described in detail.

Further, the first embodiment of the disclosure has been described. As described above, by applying the technique according to this embodiment, it is possible to appropriately switch the processing subject depending on the circumstances of the terminal device 100. As a result, it is possible to efficiently perform the information, which results in high speed processing and power saving.

3: Third Embodiment

Next, a third embodiment of the disclosure will be described. A configuration of an information processing system 10 according to this embodiment is substantially the same as the configuration of the information processing system 10 according to the first embodiment, and thus description thereof will be omitted. In addition, detailed description of substantially the same elements as in the first embodiment will be omitted.

[3-1: Functional Configuration of Terminal Device 100]

First, a functional configuration of a terminal device 100 according to this embodiment will be described with reference to FIG. 13. FIG. 13 is a diagram illustrating the functional configuration of the terminal device 100 according to this embodiment. The terminal device 100 according to this embodiment functions as a moving image generation apparatus which generates a moving image from an input still image.

Figure 13:
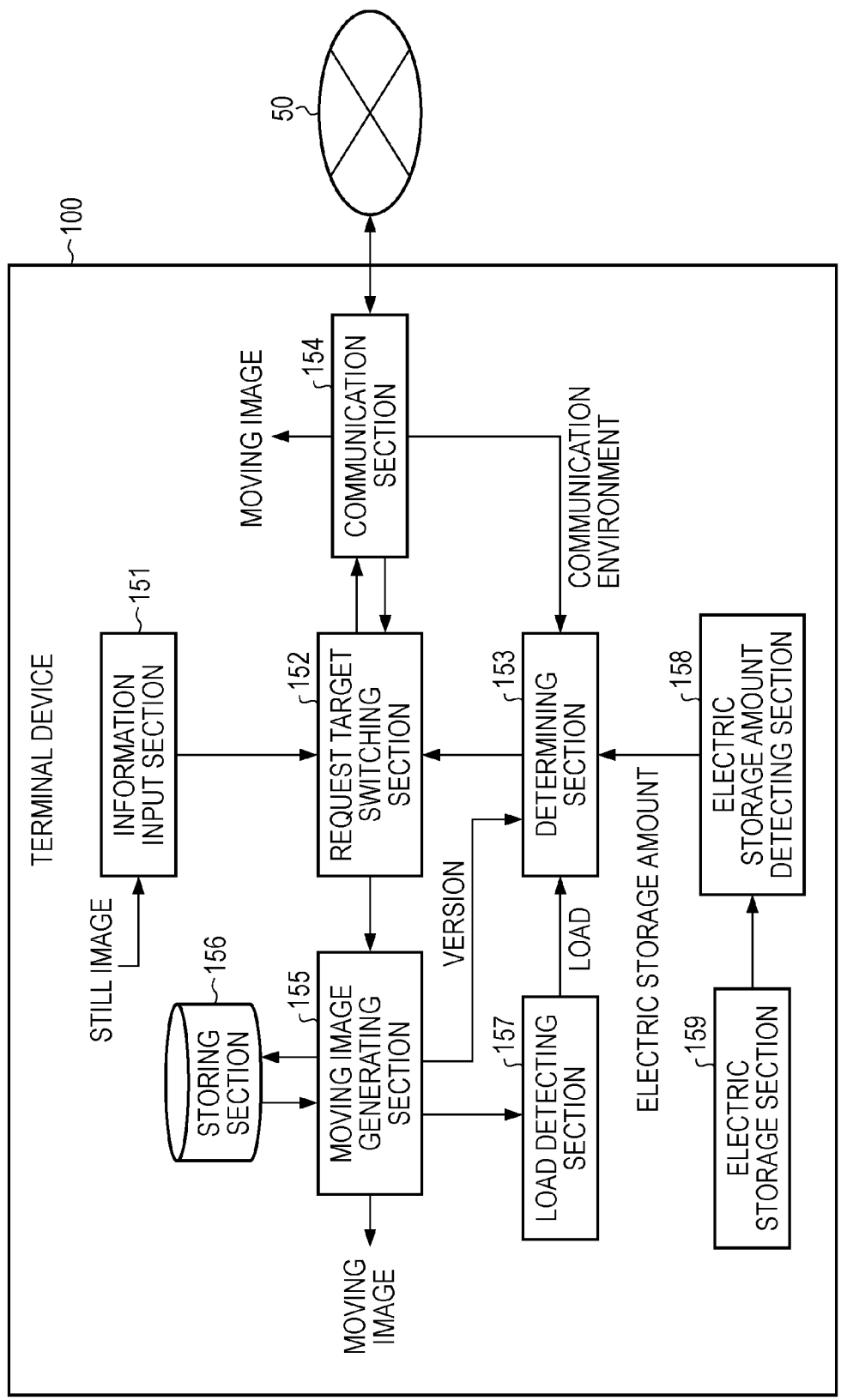
FIG. 13 is a diagram illustrating a functional configuration of a terminal device according to a third embodiment of the disclosure.

As shown in FIG. 13, the terminal device 100 mainly includes an image input section 151, a request target switching section 152, a determining section 153, a communicating section 154, a moving image generating section 155, a storing section 156, a load detecting section 157, an electric storage amount detecting section 158, and an electric storage section 159.

The image input section 151 is means for inputting a still image. The still image input through the image input section 151 is input to the request target switching section 152. The request target switching section 152 is means for switching a request for the moving image generating section 155 to perform the process of the input still image or a request for the server apparatus 200 to perform the process. Here, the request target switching section 152 switches the request target of the process according to the determination result in the determining section 153. The determining section 153 is means for determining the request target of the process according to the communication environment, the processing load, the electric storage amount and a version of an algorithm used in the process.

The communication environment is notified to the determining section 153 from the communicating section 154. Further, information indicating the load status of the moving image generating section 155 is input to the determining section 153 from the load detecting section 157. Further, information indicating the electric storage amount of the electric storage section 159 is input to the determining section 153 from the electric storage amount detecting section 158. Further, information indicating the version of the algorithm used in the process in the moving image generating section 155 is input to the determining section 153. If the above-described information is input, the determining section 153 determines whether the moving image generating section 155 or the server apparatus 200 is selected as the processing subject, on the basis of the input information. The determination result in the determining section 153 is input to the request target switching section 152.

In a case where the determination result in the determining section 153 indicates the moving image generating section 155, the request target switching section 152 inputs the still image input from the image input section 151 to the moving image generating section 155. If the still image is input, the moving image generating section 155 generates a moving image from the input still image on the basis of the algorithm stored in the storing section 156, and then outputs the moving image. When the moving image generating process is performed, the moving image generating section 155 makes use of the storing section 156 as necessary. On the other hand, in a case where the determination result in the determining section 153 indicates the server apparatus 200, the request target switching section 152 inputs the still image input from the image input section 151 to the communicating section 154. The communicating section 154 to which the still image is input transmits the input still image to the server apparatus 200 through the network 50. Further, the communicating section 154 receives the moving image transmitted from the server apparatus 200, and then outputs the moving image.

Hereinbefore, the functional configuration of the terminal device 100 has been described.

[3-2: Functional Configuration of Server Apparatus 200]

Figure 14:
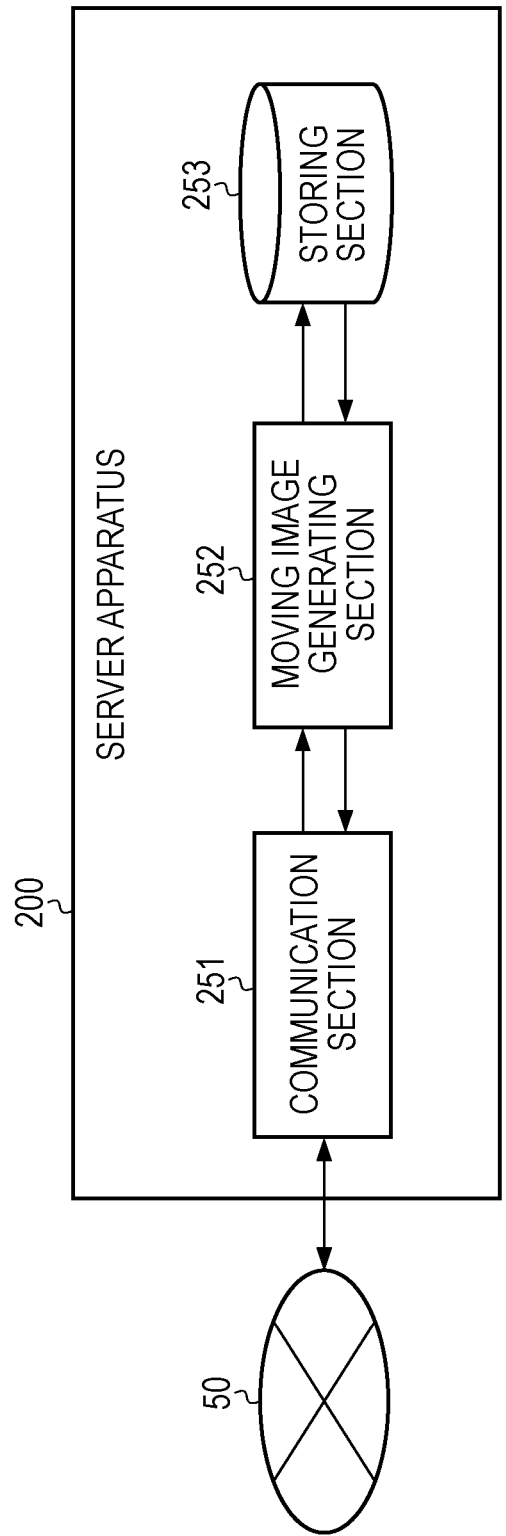
FIG. 14 is a diagram illustrating a functional configuration of a server apparatus according to the third embodiment.

Next, a functional configuration of the server apparatus 200 according to this embodiment will be described with reference to FIG. 14. FIG. 14 is a diagram illustrating the functional configuration of the server apparatus 200 according to this embodiment. The server apparatus 200 according to this embodiment functions as a moving image generation apparatus which generates a moving image from an input still image.

As shown in FIG. 14, the server apparatus 200 mainly includes a communicating section 251, a moving image generating section 252, and a storing section 253.

As described above, if the server apparatus 200 is selected by the terminal device 100 as the processing subject, the still image is transmitted to the server apparatus 200 from the terminal device 100. The still image transmitted from the terminal device 100 is transmitted to the server apparatus 200 through the network 50, and is received by the communicating section 251. If the still image is received, the communicating section 251 inputs the received still image to the moving image generating section 252.

If the still image is input, the moving image generating section 252 generates a moving image from the input still image on the basis of an algorithm stored in the storing section 253, and then outputs the moving image. When performing the moving image generation process, the moving image generating section 252 utilizes the storing section 253 as necessary. The moving image output by the moving image generating section 252 is input to the communicating section 251. If the moving image is input, the communicating section 251 transmits the input moving image to the terminal device 100 through the network 50.

Further, when receiving an inquiry about a version of an algorithm from the terminal device 100, the server apparatus 200 notifies the terminal device 100 of the version of the algorithm used in the moving image generation process by the moving image generating section 252. First, if the inquiry is input through the network 50, the communicating section 251 receives the inquiry, and then notifies the moving image generating section 252 of the inquiry. The moving image generating section 252 which has received the inquiry confirms the version of the algorithm used in the moving image generation process, and then inputs information indicating the version to the communicating section 251. If the information indicating the version is input, the communicating section 251 transmits the information indicating the version to the terminal device 100 through the network 50.

Hereinbefore, the functional configuration of the server apparatus 200 has been described.

<<Functions of Moving Image Generating Sections 155 and 252>>

Figure 15:
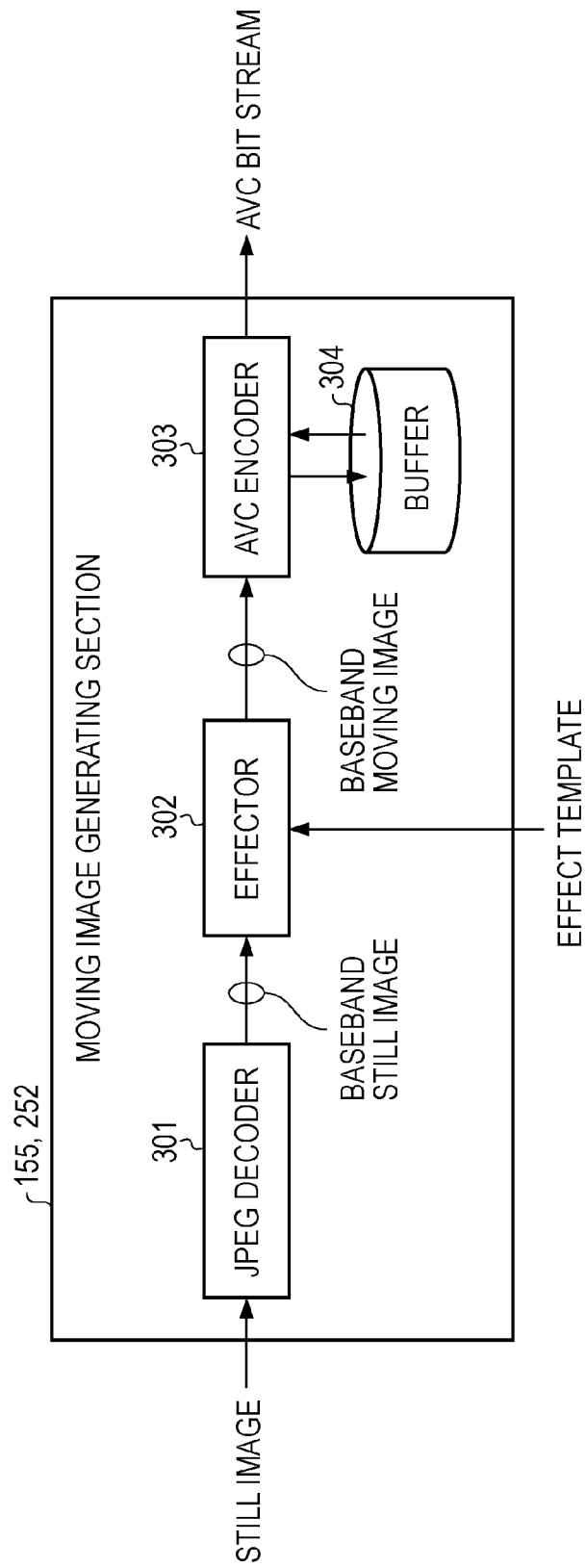
FIG. 15 is a diagram illustrating a detailed functional configuration of a moving image generating section according to the third embodiment.

Here, functions of moving image generating sections 155 and 252 will be described in detail with reference to FIG. 15. FIG. 15 is a diagram illustrating the functions of the moving image generating sections 155 and 252.

As shown in FIG. 15, the moving image generating section 155 or 252 includes a JPEG decoder 301, an effector 302, an AVC encoder 303, and a buffer 304. An effect template is assumed to be input to the effector 302. Further, a still image input to the moving image generating section 155 or 252 is assumed to be encoded in a JPEG format. Here, JPEG is an abbreviation of Joint Photographic Experts Group. Further, AVC is an abbreviation of Advanced Video Coding.

Firstly, if the still image is input to the moving image generating section 155 or 252, the still image is input to the JPEG decoder 301. If the still image is input, the JPEG decoder 301 decodes the still image coded in the JPEG format and then generates baseband data of the still image (hereinafter, referred to as a baseband still image). The baseband still image generated by the JPEG decoder 301 is input to the effector 302. If the baseband still image is input, the effector 302 generates baseband data of the moving image (hereinafter, baseband moving image) from the baseband still image using the effect template.

The baseband moving image generated by the effector 302 is input to the AVC encoder 303. If the baseband moving image is input, the AVC encoder 303 encodes the input baseband moving image in a format such as an H.264/AVC and generates a moving image (AVC bit stream). At this time, the AVC encoder 303 performs a process such as intra-frame compression coding or inter-frame compression coding to the baseband moving image using the buffer 304. The moving image (AVC bit stream) generated by the AVC encoder 303 is output from the moving image generating section 155 or 252.

Hereinbefore, the functions of the moving image generating sections 155 and 252 have been described. In the above description, for ease of description, it is assumed that the format of input still images is JPEG and the format of output still images is AVC. However, an application range of the technique according to the present embodiment is not limited thereto, and input still images may employ a format other than JPEG, or output still images may employ a format other than AVC.

[3-3: Operation of Terminal Device 100]

Figure 16:
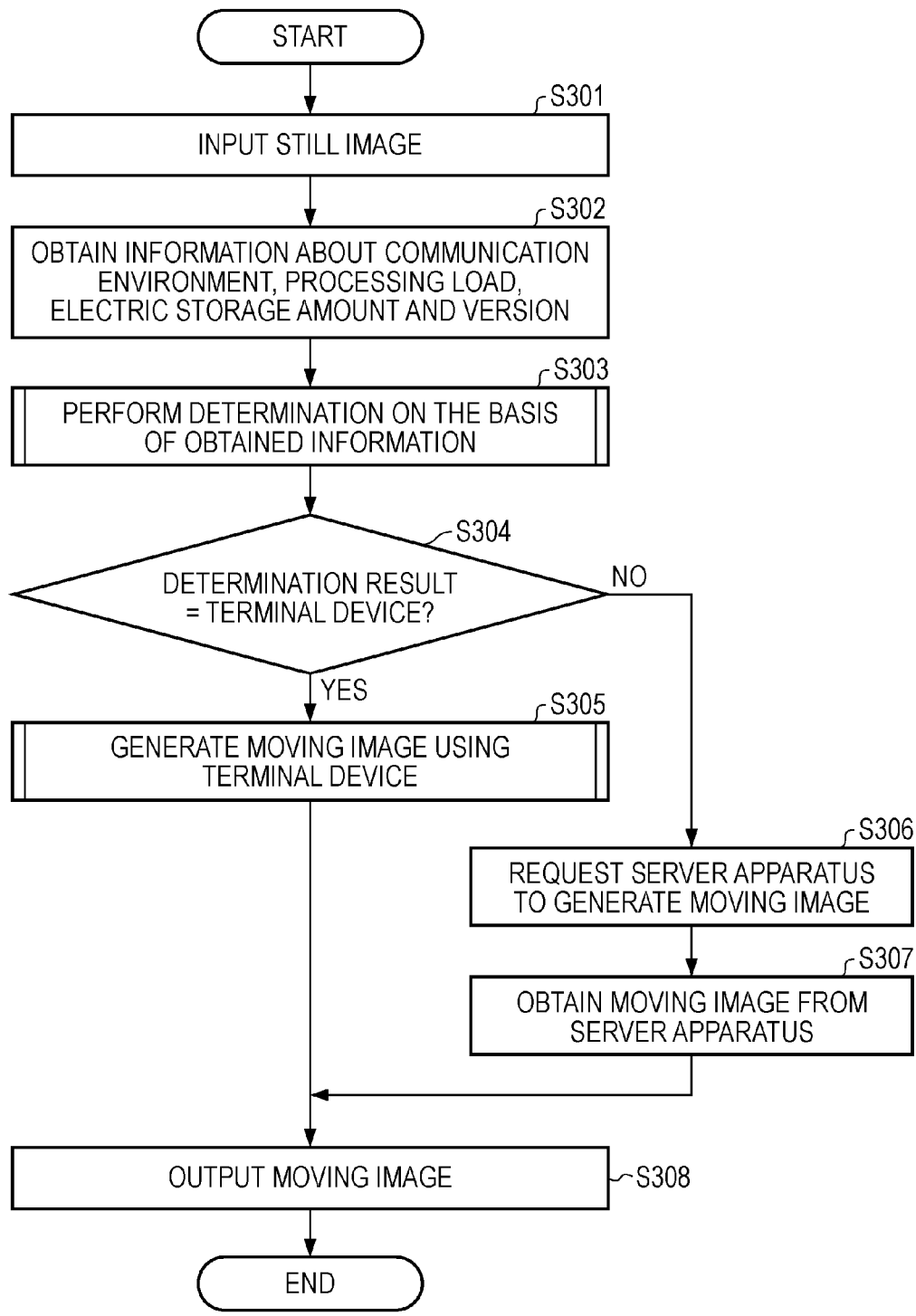
FIG. 16 is a diagram illustrating an operation of the terminal device according to the third embodiment.
Figure 17:
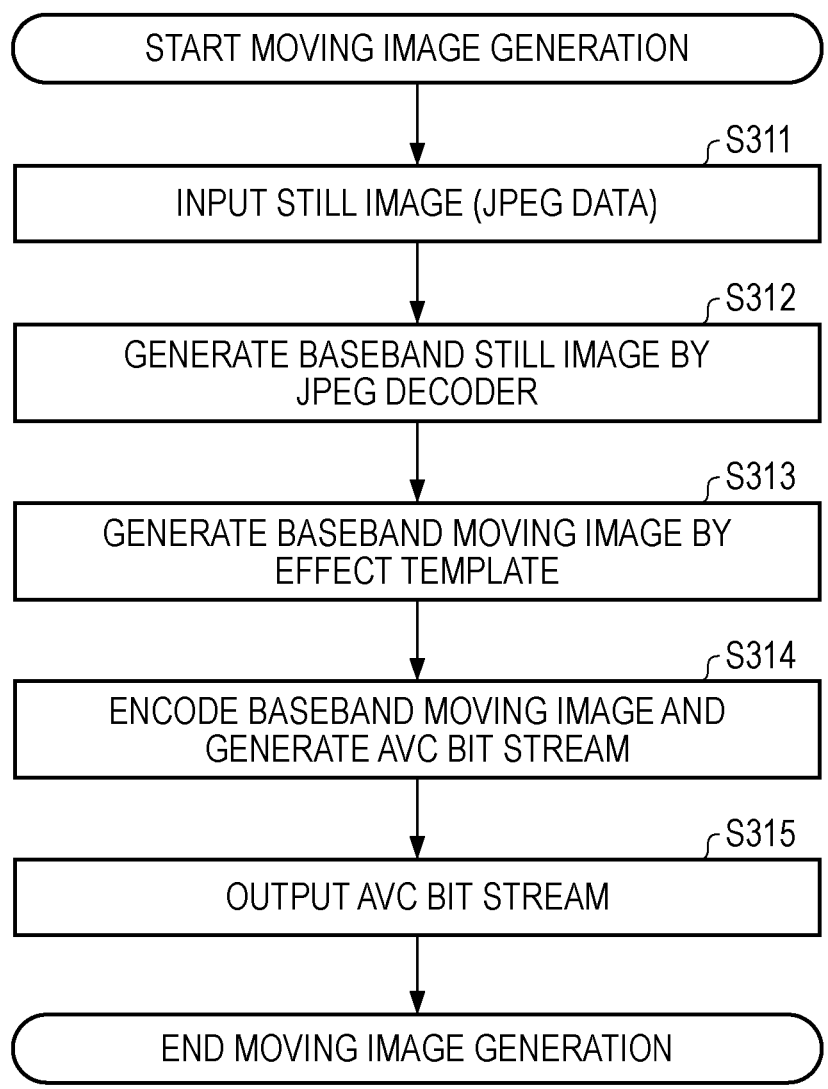
FIG. 17 is a diagram illustrating an example of a moving image generation method according to the third embodiment.

Next, an operation of the terminal device 100 according to this embodiment will be described with reference to FIGS. 16 and 17. FIGS. 16 and 17 are diagrams illustrating the operation of the terminal device 100 according to this embodiment.

[3-3-1: Overall Process Flow]

Firstly, an overall process flow of the terminal device 100 will be described.

As shown in FIG. 16, the still image is firstly input through the image input section 151 (S301). If the still image is input, the terminal device 100 obtains the communication environment information from the communicating section 154, obtains the load information from the load detecting section 157, obtains the electric storage amount information from the electric storage amount detecting section 158, and obtains the version information from the moving image generating section 155 (S302). Then, the terminal device 100 determines whether the moving image generating section 155 (terminal device 100) or the server apparatus 200 is selected as the processing subject of the moving image, using the function of the determining section 153 (S303). The terminal device 100 confirms the determination result, and determines whether the moving image generating section 155 is selected as the processing subject (determination result=terminal device) (S304).

In a case where the moving image generating section 155 is selected as the processing subject (determination result=terminal device), the terminal device 100 allows the routine to proceed to step S305. On the other hand, in a case where the server apparatus 200 is selected as the processing subject (determination result=server apparatus), the terminal device 100 allows the routine to proceed to step S306. When the routine proceeds to step S305, the terminal device 100 inputs the still image to the moving image generating section 155 using the function of the request target switching section 152 (S305). If the still image is input, the moving image generating section 155 generates a moving image from the input still image. The terminal device 100 which has generated the moving image using the function of the moving image generating section 155 allows the routine to proceed to step S308.

On the other hand, in a case where the routine proceeds to step S306, the terminal device 100 requests the server apparatus 200 to perform the process for the still image using the function of the request target switching section 152 (S306).

At this time, the terminal device 100 transmits the still image to the server apparatus 200 using the function of the communicating section 154. The server apparatus 200 which has received the still image generates a moving image from the received still image using the function of the information processing section 202. The moving image generated by the server apparatus 200 is transmitted to the terminal device 100 through the network 50. The terminal device 100 receives the moving image from the server apparatus 200 using the function of the communicating section 154 (S307), and then allows the routine to proceed to step S308.

If the routine proceeds to step S308, the terminal device 100 outputs the moving image using the function of the moving image generating section 155 or the moving image received from the communicating section 154 (S308).

Hereinbefore, the overall process flow of the terminal device 100 has been described.

(3-3-2: Moving Image Generation Method)

Next, a moving image generating method will be briefly described.

As shown in FIG. 17, the still image is firstly input to the moving image generating section 155 or 252 (S311). Then, the moving image generating section 155 or 252 generates a baseband still image from the input still image using the function of the JPEG decoder 301 (S312). Thereafter, the moving image generating section 155 or 252 generates a baseband moving image from the baseband still image using the function of the effector 302 (S313). Then, the moving image generating section 155 or 252 encodes the baseband moving image using the function of the AVC encoder 303 to generate the moving image (AVC bit stream) (S314). Thereafter, the moving image generating section 155 or 252 outputs the generated moving image (AVC bit stream) (S315), and then terminates the series of processes relating to the moving image generation.

Hereinbefore, the flow of the moving image generation process has been described.

Further, the third embodiment has been described. As described above, by applying the technique according to this embodiment, it is possible to appropriately switch the processing subject depending on the circumstances of the terminal device 100. As a result, it is possible to efficiently generate the moving image from the still image, which results in high speed processing and power saving. Here, the method of generating the moving image from the still image is exemplified, but it is also possible to effectively utilize the technique according to this embodiment when a moving image, a still image, sound and the like are combined to control video content.

4: Fourth Embodiment

Next, a fourth embodiment of the disclosure will be described. A configuration of an information processing system 10 according to this embodiment is substantially the same as the configuration of the information processing system 10 according to the first embodiment, and thus description thereof will be omitted. In addition, detailed description of substantially the same elements as in the first embodiment will be omitted.

[4-1: Functional Configuration of Terminal Device 100]

First, a functional configuration of a terminal device 100 according to this embodiment will be described with reference to FIG. 18. FIG. 18 is a diagram illustrating the functional configuration of the terminal device 100 according to this embodiment. The terminal device 100 according to this embodiment functions as a face recognition apparatus which recognizes a face included in an input image and outputs a region in which the face is included.

Figure 18:
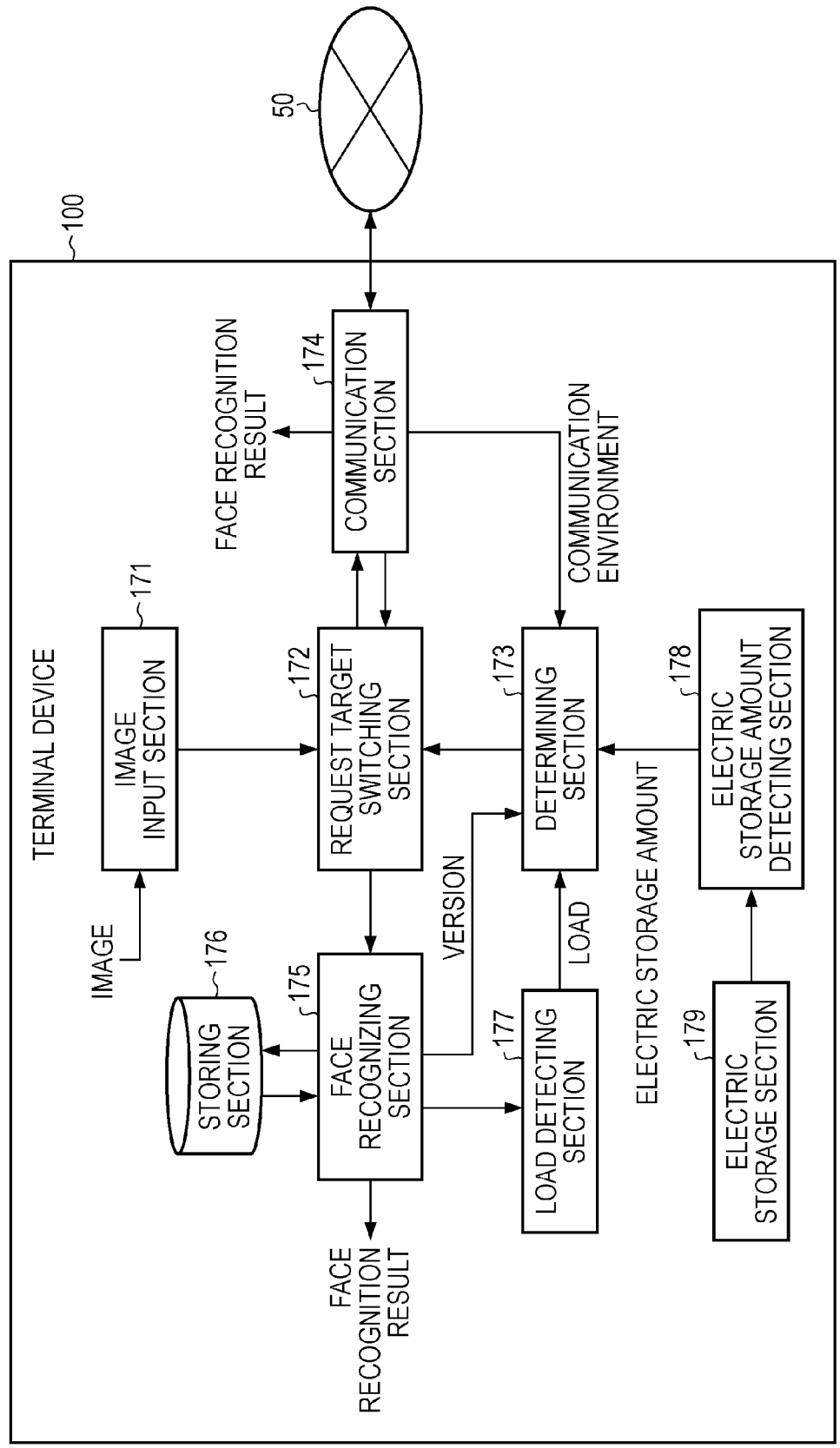
FIG. 18 is a diagram illustrating a functional configuration of a terminal device according to a fourth embodiment of the disclosure.

As shown in FIG. 18, the terminal device 100 mainly includes an image input section 171, a request target switching section 172, a determining section 173, a communicating section 174, a face recognizing section 175, a storing section 176, a load detecting section 177, an electric storage amount detecting section 178, and an electric storage section 179.

The image input section 171 is means for inputting an image. The image input through the image input section 171 is input to the request target switching section 172. The request target switching section 172 is means for switching a request for the face recognizing section 175 to perform the process of the input image or a request for the server apparatus 200 to perform the process. Here, the request target switching section 172 switches the request target of the process according to the determination result in the determining section 173. The determining section 173 is means for determining the request target of the process according to the communication environment, the processing load, the electric storage amount and a version of an algorithm used in the process.

The communication environment is notified to the determining section 173 from the communicating section 174. Further, information indicating the load status of the face recognizing section 175 is input to the determining section 173 from the load detecting section 177. Further, information indicating the electric storage amount of the electric storage section 179 is input to the determining section 173 from the electric storage amount detecting section 178. Further, information indicating the version of the algorithm used in the process in the face recognizing section 175 is input to the determining section 173. If the above-described information is input, the determining section 173 determines whether the face recognizing section 175 or the server apparatus 200 is selected as the processing subject, on the basis of the input information. The determination result in the determining section 173 is input to the request target switching section 172.

In a case where the determination result in the determining section 173 indicates the face recognizing section 175, the request target switching section 172 inputs the image input from the image input section 171 to the face recognizing section 175. If the image is input, the face recognizing section 175 recognizes a face from the input image on the basis of a face recognition algorithm stored in the storing section 176, and then outputs the region in which the face is included. When the face recognition process is performed, the face recognizing section 175 makes use of the storing section 176 as necessary. On the other hand, in a case where the determination result in the determining section 173 indicates the server apparatus 200, the request target switching section 172 inputs the image input from the image input section 171 to the communicating section 174. The communicating section 174 which has received the image transmits the input image to the server apparatus 200 through the network 50. Further, the communicating section 174 receives the face recognition result transmitted from the server apparatus 200, and then outputs the result.

Hereinbefore, the functional configuration of the terminal device 100 has been described.

[4-2: Functional Configuration of Server Apparatus 200]

Figure 19:
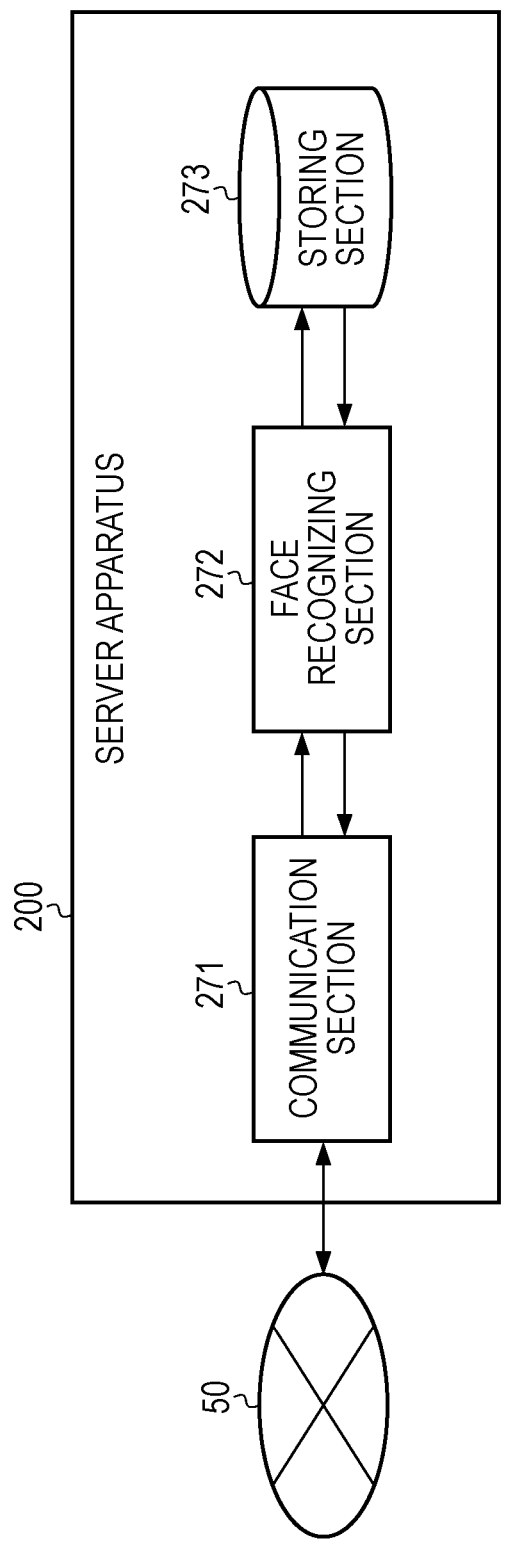
FIG. 19 is a diagram illustrating a functional configuration of a server apparatus according to the fourth embodiment.

Next, a functional configuration of the server apparatus 200 according to this embodiment will be described with reference to FIG. 19. FIG. 19 is a diagram illustrating the functional configuration of the server apparatus 200 according to this embodiment. The server apparatus 200 according to this embodiment functions as a face recognition apparatus which recognizes a face included in an input image and outputs a region in which the face is included.

As shown in FIG. 19, the server apparatus 200 mainly includes a communicating section 271, a face recognizing section 272, and a storing section 273.

As described above, if the server apparatus 200 is selected by the terminal device 100 as the processing subject, an image is transmitted to the server apparatus 200 from the terminal device 100. The image transmitted from the terminal device 100 is transmitted to the server apparatus 200 through the network 50, and is received by the communicating section 271. If the image is received, the communicating section 271 inputs the received image to the face recognizing section 272.

If the image is input, the face recognizing section 272 detects a face from the input image on the basis of a face recognition algorithm stored in the storing section 273, and outputs a region which includes the face. When the face recognition process is performed, the face recognizing section 272 makes use of the storing section 273 as necessary. The face recognition processing result output by the face recognizing section 272 is input to the communicating section 271. If the face recognition result is input, the communicating section 271 transmits the input face recognition result to the terminal device 100 through the network 50.

Further, when receiving an inquiry about a version of an algorithm from the terminal device 100, the server apparatus 200 notifies the terminal device 100 of the version of the face recognition algorithm used in the face recognition process by the face recognizing section 272. First, if the inquiry is input through the network 50, the communicating section 271 receives the inquiry, and then notifies the face recognizing section 272 of the inquiry. The face recognizing section 272 which has received the notification confirms the version of the face recognition algorithm used in the face recognition process, and then inputs information indicating the version to the communicating section 271. If the information indicating the version is input, the communicating section 271 transmits the information indicating the version to the terminal device 100 through the network 50.

Hereinbefore, the functional configuration of the server apparatus 200 has been described.

[4-3: Operation of Terminal Device 100]

Figure 20:
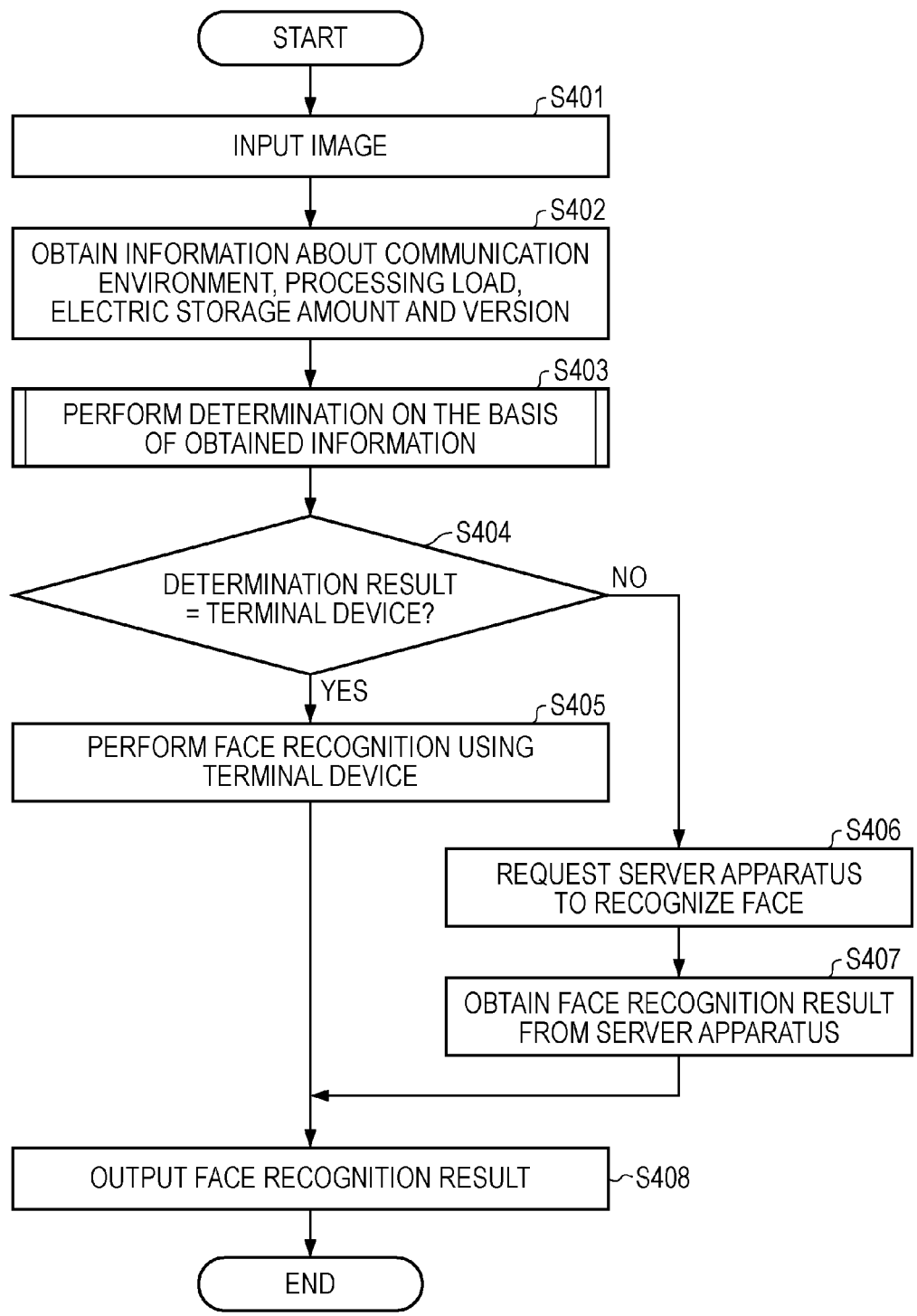
FIG. 20 is a diagram illustrating an operation of the terminal device according to the fourth embodiment.

Next, an operation of the terminal device 100 according to this embodiment will be described with reference to FIG. 20. FIG. 20 is a diagram illustrating the operation of the terminal device 100 according to this embodiment.

As shown in FIG. 20, an image is firstly input through the image input section 171 (S401). If the image is input, the terminal device 100 obtains the communication environment information from the communicating section 174, obtains the load information from the load detecting section 177, obtains the electric storage amount information from the electric storage amount detecting section 178, and obtains the version information from the face recognizing section 175 (S402). Then, the terminal device 100 determines whether the face recognizing section 175 (terminal device 100) or the server apparatus 200 is selected as the processing subject of the image, using the function of the determining section 173 (S403). The terminal device 100 confirms the determination result, and determines whether the face recognizing section 175 is selected as the processing subject (determination result=terminal device) (S404).

In a case where the face recognizing section 175 is selected as the processing subject (determination result=terminal device), the terminal device 100 allows the routine to proceed to step S405. On the other hand, in a case where the server apparatus 200 is selected as the processing subject (determination result=server apparatus), the terminal device 100 allows the routine to proceed to step S406. When the routine proceeds to step S405, the terminal device 100 inputs the image to the face recognizing section 175 using the function of the request target switching section 172 (S405). If the image is input, the face recognizing section 175 recognizes a face included in the input image. The terminal device 100, after recognizing the face included in the image using the function of the face recognizing section 175, allows the routine to proceed to step S408.

On the other hand, in a case where the routine proceeds to step S406, the terminal device 100 requests the server apparatus 200 to perform the recognition process of the face included in the image using the function of the request target switching section 172 (S406). At this time, the terminal device 100 transmits the image to the server apparatus 200 using the function of the communicating section 174. The server apparatus 200 which has received the image recognizes the face included in the received image using the function of the information processing section 202. The face recognition result in the server apparatus 200 is transmitted to the terminal device 100 through the network 50. The terminal device 100 receives the face recognition result from the server apparatus 200 using the function of the communicating section 174 (S407), and then allows the routine to proceed to step S408.

If the routine proceeds to step S408, the terminal device 100 outputs the face recognition result obtained using the function of the face recognizing section 175 or the face recognition result received by the communicating section 174 (S408).

Hereinbefore, the overall process flow of the terminal device 100 has been described.

Further, the fourth embodiment of the disclosure has been described. As described above, by applying the technique according to this embodiment, it is possible to appropriately switch the processing subject depending on the circumstances of the terminal device 100. As a result, it is possible to efficiently perform the face recognition process, which results in high speed processing and power saving. As described above, the technique according to this embodiment effectively works for a system which performs a process with a high load such as an image process, a sound process or face recognition.

5: Hardware Configuration

Figure 21:
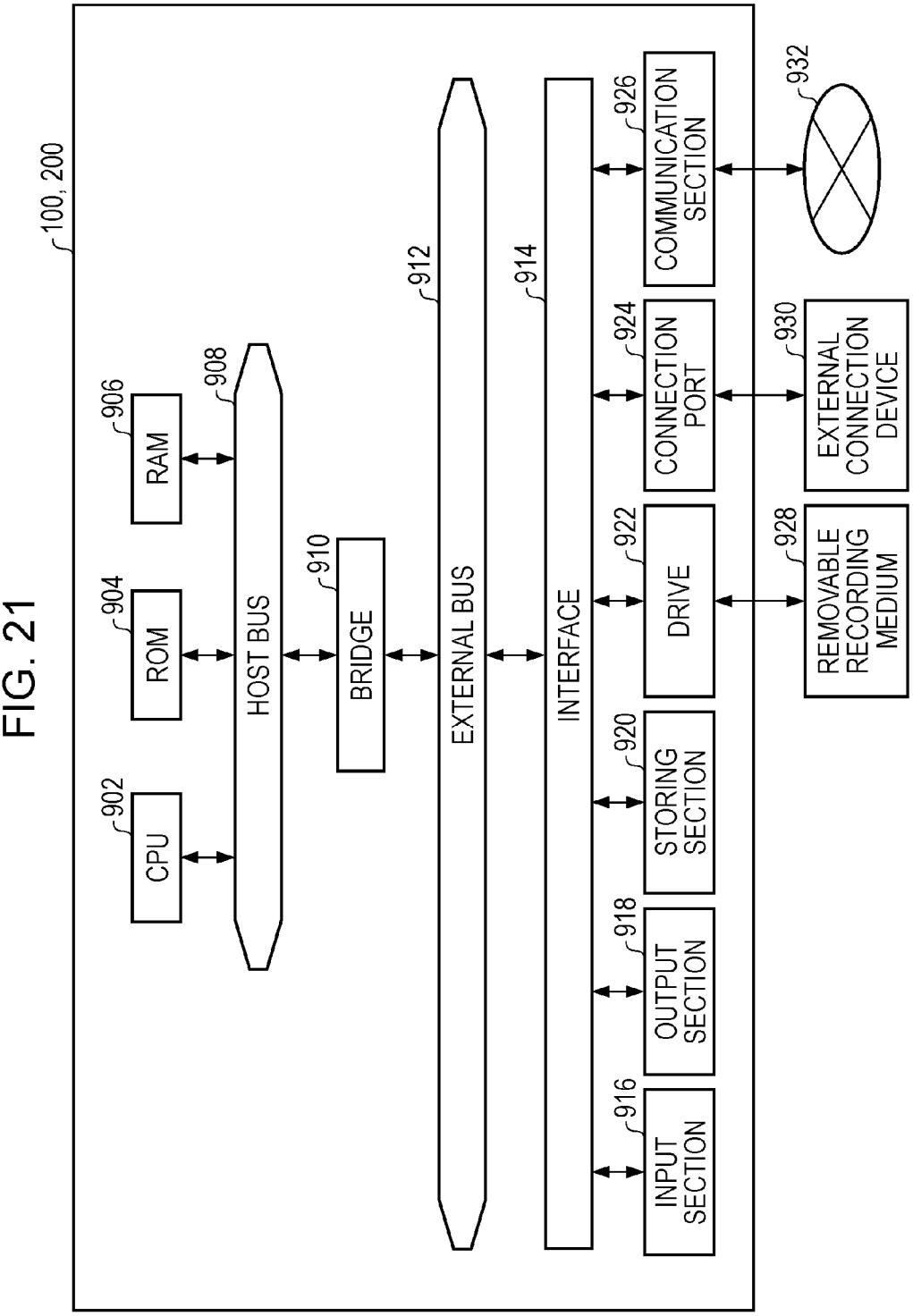
FIG. 21 is a diagram illustrating a hardware configuration capable of realizing functions of the terminal device and the server apparatus according to each embodiment of the disclosure.

The functions of the respective components of the terminal device 100 and the server apparatus 200 may be realized using a hardware configuration shown in FIG. 21, for example. That is, the functions of the respective components may be realized by controlling hardware shown in FIG. 21 using a computer program. The type of the hardware is arbitrary, and for example, may include a portable information terminal such as a personal computer, mobile phone, PHS or PDA, a videogames machine, or a variety of information home electronics. Here, PHS is an abbreviation of Personal Handy-phone System. Further, PDA is an abbreviation of Personal Digital Assistant.

As shown in FIG. 21, the hardware mainly includes a CPU 902, a ROM 904, a RAM 906, a host bus 908, and a bridge 910. Further, the hardware includes an external bus 912, an interface 914, an input section 916, an output section 918, a storing section 920, a drive 922, a connection port 924, and a communicating section 926. Here, CPU is an abbreviation of Central Processing Unit; ROM is an abbreviation of Read Only Memory; and RAM is an abbreviation of Random Access Memory.

The CPU 902 functions as an arithmetic processing unit or a control unit, for example, and controls overall operations of the respective components or a part thereof on the basis of a variety of programs stored in the ROM 904, the RAM 906, the storing section 920 or a removable recording medium 928. The ROM 904 is means for storing a program read by the CPU 902 or data used for calculation. For example, the program read by the CPU 902 or a variety of parameters which appropriately changes when the program is executed is temporarily or permanently stored in the RAM 906.

These components are connected with each other through the host bus 908 capable of transmitting data at high speed, for example. On the other hand, the host bus 908 is connected to the external bus 912 having a relatively low data transmission speed through the bridge 910, for example. Further, as the input section 916, for example, a mouse, a keyboard, a touch panel, a button, a switch, a lever or the like may be used. Further, as the input section 916, a remote controller capable of transmitting a control signal using infrared rays or other radio waves may be used.

The output section 918 is a device capable of visibly or audibly notifying a user of obtained information, such as a display apparatus such as a CRT, LCD, PDP or ELD, an audio output apparatus such as a speaker or headphones, a printer, a mobile phone or a facsimile. Here, CRT is an abbreviation of Cathode Ray Tube. Further, LCD is an abbreviation of Liquid Crystal Display. Further, PDD is an abbreviation of Plasma Display Panel. Furthermore, ELD is an abbreviation of Electro-Luminescence Display.

The storing section 920 is a device for storing various pieces of data. As the storing section 920, for example, a magnetic storage device such as a hard disk drive (HDD), a semiconductor storage device, an optical storage device, a magneto-optical storage device, or the like is used. Here, HDD is an abbreviation of Hard Disk Drive.

For example, the drive 922 is a device which reads out information recorded on the removable recording medium 928 such as a magnetic disk, optical disc, magneto-optical disc or semiconductor memory, or writes information on the removable recording medium 928. The removable recording medium 928 is a DVD media, a Blu-ray media, HD DVD media, a variety of semiconductor storing media, or the like. For example, the removable recording medium 928 may be an IC card which is mounted with a non contact IC chip, an electronic device or the like. Here, IC is an abbreviation of Integrated Circuit.

The connection port 924 is a port for connection with an external connection device 930 such as a USB port, IEEE 1394 port, SCSI, RS-232C port or an optical audio terminal. The external connection device 930 is a printer, a mobile music player, a digital camera, a digital video camera or an IC recorder, for example. Here, USB is an abbreviation of Universal Serial Bus. Further, SCSI is an abbreviation of Small Computer System Interface.

The communicating section 926 is a communication device for connection with a network 932, and for example is a wired or wireless LAN, Bluetooth (registered trademark), a WUSB communication card, an optical communication router, an ADSL router, a variety of communication modems, or the like. Further, the network 932 connected with the communicating section 926 is configured by a network connected in a wired or wireless manner, and for example, is the Internet, a home LAN, infrared communication, visible light communication, broadcasting, satellite broadcasting, or the like. Here, LAN is an abbreviation of Local Area Network; WUSB is an abbreviation of Wireless USB; and ADSL is an abbreviation of Asymmetric Digital Subscriber Line.

6: Conclusion

Finally, technical content according to the embodiments of the disclosure will be briefly described. Here, the technical content may be applied to a variety of terminal devices, such as a PC, mobile phone, mobile videogames machine, portable information terminal, information home electronics or car navigation system, for example.

The functional configuration of the terminal device can be represented as follows. The terminal device includes the following processing section, connecting section and selecting section. The processing section performs a predetermined process. Further, the connecting section is provided for connection with an external apparatus which is capable of performing the predetermined process, through a communication network. Further, the selecting section selects the processing section or the external apparatus connected through the processing section and the connecting section as a request target which is requested to perform the predetermined process, on the basis of a predetermined condition. In this way, by switching the processing subject on the basis of the predetermined condition, it is possible to efficiently perform the predetermined process.

(Remarks)

The information processing sections 105 and 135, the moving image generating section 155 and the face recognition section 175, as described above, are examples of the processing section and a second processing section. The communicating sections 104, 134, 154 and 174, and the request target switching sections 102, 132, 152 and 172 are examples of the connecting section. The determining sections 103, 153 and 173 are examples of the selecting section. The information input sections 101 and 131, and the image input sections 151 and 171 are examples of a data output section. The load detecting sections 107, 137, 157 and 177 are examples of a load state detecting section. The communicating sections 104, 134, 154 and 174 are examples of a connection state detecting section.

The electric storage amount detecting sections 108, 138, 158 and 178 are examples of a residual amount detecting section. The determining sections 103, 133, 153 and 173, and the communicating sections 104, 134, 154 and 174 are examples of a timing obtaining section and a version information obtaining section. The determining sections 103, 133, 153 and 173 are examples of a version comparing section. The server apparatus 200 is an example of the external apparatus. The information processing sections 202 and 232, the moving image generating section 252, and the face recognition section 272 are examples of a first processing section.

Hereinbefore, the preferred embodiments of the disclosure have been described with reference to the accompanying drawings, but the disclosure is not limited thereto. It will be apparent to those skilled in the art that a variety of modifications can be made within the scope of claims, which should be interpreted to be included in the technical scope of the present disclosure.

The present disclosure contains subject matter related to that disclosed in Japanese Priority Patent Application JP 2010-198982 filed in the Japan Patent Office on Sep. 6, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal device comprising:
   a processing section configured to perform a predetermined process;
   a connecting section which is configured to connect with an external apparatus capable of performing the predetermined process through a communication network;
   a version information obtaining section configured to obtain a version of an algorithm used if the external apparatus performs the predetermined process; and
   a version comparing section configured to compare the version obtained by the version information obtaining section with a version of the algorithm used if the processing section performs the predetermined process, and to produce a comparison result; and
   a selecting section configured to select the processing section or the external apparatus connected through the connecting section as a request target to perform the predetermined process based at least in part on the comparison result.

2. The terminal device according to claim 1, further comprising:
   a data output section configured to output data for which the predetermined process is to be performed,
   wherein when the request target is changed into the processing section from the external apparatus by the selecting section, the connecting section stops the data output of the data output section and obtains data necessary for the processing section to continuously perform the predetermined process from the external apparatus.

3. The terminal device according to claim 2, further comprising:
   a timing obtaining section configured to inquire of the external apparatus a timing when a processing subject is able to be changed from the external apparatus to the processing section and obtain information indicating the timing from the external apparatus, when the request target is changed into the processing section from the external apparatus by the selecting section,
   wherein the connecting section allows the data output section to restart the data output at the timing indicated by the information obtained by the timing obtaining section and allows the processing section to perform the predetermined process.

4. The terminal device according to claim 1, further comprising:
   a load state detecting section configured to detect a load state of the processing section,
   wherein the selecting section selects the external apparatus connected through the connecting section in a case where the load state of the processing section detected by the load state detecting section is high, and selects the processing section in a case where the load state of the processing section detected by the load state detecting section is low.

5. The terminal device according to claim 1, further comprising:
   a connection state detecting section configured to detect a connection state through the connecting section,
   wherein the selecting section selects the processing section or the external apparatus connected through the connecting section, according to the connection state detected by the connection state detecting section.

6. The terminal device according to claim 5,
   wherein the connection state detecting section detects whether high speed communication is available with respect to the external apparatus, and
   wherein the selecting section selects the external apparatus connected through the connecting section in a case where it is detected by the connection state detecting section that high speed communication is available with respect to the external apparatus.

7. The terminal device according to claim 5,
   wherein the connection state detecting section detects a bandwidth which is available for communication with the external apparatus, and
   wherein the selecting section selects the external apparatus connected through the connecting section in a case where the bandwidth detected by the connection state detecting section is larger than a predetermined threshold.

8. The terminal device according to claim 1, further comprising:
   an electric storage section configured to store electric power used for at least an operation of the processing section; and
   a residual amount detecting section configured to detect an amount of the electric power stored in the electric storage section,
   wherein the selecting section selects the external apparatus connected through the connecting section in a case where the amount of electric power detected by the residual amount detecting section is smaller than a predetermined value.

9. The terminal device according to claim 1, wherein the selecting section selects the external apparatus, in a case where it is determined based at least in part on the comparison result that the version indicated by the version information section is newer version than the version of the algorithm used if the processing section performs the predetermined process.

10. An information processing system comprising:
    an external apparatus comprising a first processing section configured to perform a predetermined process; and
    a terminal device comprising:
      a second processing section configured to perform the predetermined process,
      a connecting section configured to connect with the external apparatus through a communication network,
      a version information obtaining section configured to obtain a version of an algorithm used if the external apparatus performs the predetermined process; and
      a version comparing section configured to compare the version obtained by the version information obtaining section with a version of an algorithm used if the processing section performs the predetermined process, and to produce a comparison result; and
      a selecting section configured to select the second processing section or the external apparatus connected through the connecting section as a request target to perform the predetermined process, based at least in part on the comparison result.

11. A request target selection method comprising:
    by a terminal device comprising a processing section configured to perform a predetermined process, a connecting section configured to connect with an external apparatus capable of performing the predetermined process through a communication network, a version information obtaining section configured to obtain a version of an algorithm used if the external apparatus performs the predetermined process, and a version comparing section configured to compare the version obtained by the version information obtaining section with a version of an algorithm used if the processing section performs the predetermined process and to produce a comparison result, selecting the processing section or the external apparatus connected through the connecting section as a request target to perform the predetermined process, based at least in part on the comparison result.

12. The request target selection method according to claim 11, wherein the terminal device comprises a data output section configured to output data for which the predetermined process is to be performed, and the request target selection method comprises, if the request target is changed to the processing section from the external apparatus, the connecting section stopping the data output of the data output section and obtaining data necessary for the processing section to continuously perform the predetermined process from the external apparatus.

13. The request target selection method according to claim 12, wherein the terminal device comprises a timing obtaining section configured to inquire of the external apparatus a timing when a processing subject is able to be changed from the external apparatus to the processing section and to obtain information indicating the timing from the external apparatus, if the request target is changed into the processing section from the external apparatus by the selecting section, and wherein the request target selection method comprises the connecting section allowing the data output section to restart the data output at the timing indicated by the information obtained by the timing obtaining section and allows the processing section to perform the predetermined process.

14. The request target selection method according to claim 11, wherein the terminal device comprises a load state detecting section configured to detect a load state of the processing section, and the request target selection method comprises the terminal device selecting the external apparatus connected through the connecting section in a case where the load state of the processing section detected by the load state detecting section is high and selecting the processing section in a case where the load state of the processing section detected by the load state detecting section is low.

15. The request target selection method according to claim 11, wherein the terminal device comprises a connection state detecting section configured to detect a connection state through the connecting section, and the request target selection method comprises the terminal device selecting the processing section or the external apparatus connected through the connecting section according to the connection state detected by the connection state detecting section.

16. The request target selection method according to claim 15, wherein the request target selection method comprises:
the connection state detecting section detecting whether high speed communication is available with respect to the external apparatus, and
the terminal device selecting the external apparatus connected through the connecting section in a case where it is detected by the connection state detecting section that high speed communication is available with respect to the external apparatus.

17. The request target selection method according to claim 15, wherein the request target selection method comprises:
the connection state detecting section detecting a bandwidth which is available for communication with the external apparatus, and the terminal device selecting the external apparatus connected through the connecting section in a case where the bandwidth detected by the connection state detecting section is greater than a predetermined threshold.

18. The request target selection method according to claim 11, wherein the terminal device comprises an electric storage section configured to store electric power used for at least an operation of the processing section and a residual amount detecting section configured to detect an amount of the electric power stored in the electric storage section, and the request target selection method comprises the terminal device selecting the external apparatus connected through the connecting section in a case where the amount of electric power detected by the residual amount detecting section is less than a predetermined amount.

19. The request target selection method according to claim 11, wherein the act of selecting comprises the terminal device selecting the external apparatus in a case where it is determined based at least in part on the comparison result that the version indicated by the version information section is newer version than the version of the algorithm used if the processing section performs the predetermined process.

20. At least one storage device having at least one program recorded thereon which, when executed, causes a computer to execute functions comprising:
connecting the computer with an external apparatus, capable of performing a predetermined process, through a communication network;
obtaining a version of an algorithm used if the external apparatus performs the predetermined process;
comparing the version used if the external apparatus performs the predetermined process with a version of the algorithm used if the computer performs the predetermined process; and
selecting the external apparatus connected through the connecting section or the computer as a request target to perform the predetermined process, based at least in part on a result of the comparing.

21. The at least one storage device according to claim 20, wherein the at least one program, when executed, causes the computer to stop data output if the request target is changed to the computer from the external apparatus, and to obtain data necessary for the computer to continuously perform the predetermined process from the external apparatus.

22. The at least one storage device according to claim 21, wherein the at least one program, when executed, causes the computer to inquire of the external apparatus a timing when a processing subject is able to be changed from the external apparatus to the computer, to obtain information indicating the timing from the external apparatus if the request target is changed to the computer from the external apparatus, and to restart data output at the timing indicated by the information obtained from the external apparatus to allow the computer to perform the predetermined process.

23. The at least one storage device according to claim 20, wherein the at least one program, when executed, causes the computer to select the external apparatus to perform the predetermined process in a case where the load state of the computer is high, and to select the computer to perform the predetermined process in a case where the load state of the computer is low.

24. The at least one storage device according to claim 20, wherein the at least one program, when executed, causes the computer to select the computer or the external apparatus according to a connection state between the computer and the external apparatus.

25. The at least one storage device according to claim 24, wherein the at least one program, when executed, causes the computer to detect whether high speed communication is available with respect to the external apparatus, and to select the external apparatus in a case where it is detected that high speed communication is available with respect to the external apparatus.

26. The at least one storage device according to claim 24, wherein the at least one program, when executed, causes the computer to detect a bandwidth available for communication with the external apparatus, and to select the external apparatus in a case where the detected bandwidth is greater than a predetermined threshold.

27. The at least one storage device according to claim 20, wherein the computer is configured to store electric power and to detect an amount of the electric power that is stored, and wherein the at least one program, when executed, causes the computer to select the external apparatus in a case where the detected amount of electric power is less than a predetermined amount.

28. The at least one storage device according to claim 20, wherein the at least one program, when executed, causes the computer to select the external apparatus in a case where it is determined based at least in part on the comparison result that the version indicated by the version information section is newer than the version used if the computer performs the predetermined process.

* * * * *